United States Patent
Schuette et al.

(10) Patent No.: US 8,996,781 B2
(45) Date of Patent: Mar. 31, 2015

(54) INTEGRATED STORAGE/PROCESSING DEVICES, SYSTEMS AND METHODS FOR PERFORMING BIG DATA ANALYTICS

(71) Applicant: OCZ Technology Group Inc., San Jose, CA (US)

(72) Inventors: Franz Michael Schuette, Colorado Springs, CO (US); Gary James Calder, Eastleigh (GB); Yaron Klein, Raanana (IL); Stephen Jeffrey Smith, Morgan Hill, CA (US)

(73) Assignee: OCZ Storage Solutions Inc., San Jose, CA (US)

( * ) Notice: Subject to any disclaimer, the term of this patent is extended or adjusted under 35 U.S.C. 154(b) by 259 days.

(21) Appl. No.: 13/669,727

(22) Filed: Nov. 6, 2012

(65) Prior Publication Data
US 2014/0129753 A1 May 8, 2014

(51) Int. Cl.
*G06F 13/40* (2006.01)

(52) U.S. Cl.
CPC .... *G06F 13/4068* (2013.01); *G06F 2213/0026* (2013.01)
USPC .......................................... 710/313; 710/301

(58) Field of Classification Search
CPC ............... G06F 1/185; G06F 13/4068; G06F 2213/026; G06F 13/4022; G06F 13/4027
USPC ......................................... 710/300, 301, 313
See application file for complete search history.

(56) References Cited

U.S. PATENT DOCUMENTS

| | | | | |
|---|---|---|---|---|
| 7,562,174 | B2* | 7/2009 | Danilak | 710/305 |
| 8,493,394 | B2* | 7/2013 | Chen | 345/520 |
| 2009/0248941 | A1* | 10/2009 | Morein et al. | 710/308 |
| 2010/0088453 | A1* | 4/2010 | Solki et al. | 710/313 |
| 2011/0292058 | A1 | 12/2011 | Herr et al. | |
| 2013/0117305 | A1* | 5/2013 | Varakin et al. | 707/769 |
| 2014/0055467 | A1* | 2/2014 | Bittner et al. | 345/520 |
| 2014/0204102 | A1* | 7/2014 | Rath et al. | 345/522 |

OTHER PUBLICATIONS

Bakkum, Peter and Skadron, Kevin; "Accelerating SQL Database Operations on a GPU with CUDA"; GPGPU-3; Pittsburgh, PA; ACM; Mar. 14, 2010.*
Koehler, Axel; "Supercomputing with NVIDIA GPUs"; International Symposium "Computer Simulations on GPU"; NVIDIA Corporation; May 2011.*
Tim C. Schroeder, "Peer-to-Peer & Unified Virtual Addressing", CUDA Webinar, 2011.
NVIDIA GPU Direct TM Technology, 2011.
Mellanox Technologies, NVIDIA GPU Direct TM Technology-Accelerating GPU-based systems, May 2010.
NVIDIA GPUDirect, Nov. 7, 2012.

* cited by examiner

*Primary Examiner* — Glenn A Auve
(74) *Attorney, Agent, or Firm* — Hartman Global IP Law; Gary M. Hartman; Michael D. Winter

(57) ABSTRACT

Architectures and methods for performing big data analytics by providing an integrated storage/processing system containing non-volatile memory devices that form a large, non-volatile memory array and a graphics processing unit (GPU) configured for general purpose (GPGPU) computing. The non-volatile memory array is directly functionally coupled (local) with the GPU and optionally mounted on the same board (on-board) as the GPU.

49 Claims, 19 Drawing Sheets

INTEGRATED STORAGE/PROCESSING DEVICES, SYSTEMS AND METHODS FOR PERFORMING BIG DATA ANALYTICS

BACKGROUND OF THE INVENTION

The present invention generally relates to data processing systems for use in computer systems, and more particularly to systems capable of performing big data analytics as well as devices therefor.

Big data analytics is a relatively new approach to managing large amounts of data. As used herein, the term "big data" is used to describe unstructured and semi-structured data in such large volumes (for example, petabytes or exabytes of data) as to be immensely cumbersome to load into a relational database for analysis. Instead of the conventional approach of extracting information from data sets, where an operator defines criteria that are used for data analysis, big data analytics refers to a process by which the data themselves are used to generate their own search strategies based on commonalities of events, for example recurrent data structures or abnormal events, that is, unique data structures that do not match the rest of the data set. One of the prerequisites for this kind of data-driven analysis is to have data sets that are as large as possible, which in turn means that they need to be processed in the most efficient way. In most cases, the analysis involves massive parallel processing as done, for example, on a graphics processing unit (GPU). The "general purpose" type of the work load performed by a GPU has led to the term "general purpose graphics processing unit" or "GPGPU" for the processor and "GPGPU computing" for this type of computational analysis with a GPU.

Big data analytics has become the method of choice in fields like astronomy where no experimental intervention can be applied to preselect data. Rather, data are accumulated and analyzed essentially without applying any kind of filtering. Another exemplary case underscoring the importance of the emergence of big data analytics has been a study of breast cancer survivors with a somewhat surprising outcome of the study, in that the phenotypical expression and configuration of non-cancerous stromal cells was equally or even more deterministic for the survival rate of patients than the actual characteristics of the tumor cells. Interestingly, attention had not been paid to the first until a big data analytics going far beyond the immediate focus of the study was applied, in which, without preselection by an operator, all available data were loaded into the system for analysis. This example illustrates how seemingly unrelated data can hold clues to solving complex problems, and underscores the need to feed the processing units with data sets that are as complete and all-encompassing as possible, without applying preselection or bias of any sort.

The lack of bias or preselection further underpins that the data sets used in big data analytics are exactly what the name describes, meaning that data sets in excess of terabytes are not the exception but rather the norm. Conventional computer systems are not designed to digest data on massive scales for a number of reasons. General purpose central processing units (CPUs) are very good at performing a highly diverse workload, but the limitation in the number of cores, which determines the number of possible concurrent threads (including Intel's HyperThreading), prevents CPUs from being very good at massive parallel analytics of large data. For this reason, GPUs characterized by a large array of special purpose processors have been adapted to perform general purpose computing, leading to the evolution of GPGPUs. However, even with the highest-end GPGPU expansion cards currently available, for example, the Tesla series of graphics expansion cards commercially available from nVidia Corporation, the on-board (local) volatile memory (referred to as a local frame buffer, or LFB) functionally integrated with the GPGPU on the graphics expansion card is limited to 6 GB, which can only hold a fraction of the data designated to be analyzed in any given scenario. Moreover, the data need to be loaded from a host system (for example, a personal computer or server) through a PCIe (peripheral component interconnect express, or PCI Express) root complex, which typically involves access of the data through a hard disk drive or, in a more advanced configuration, through NAND flash-based solid state drives (SSDs), which receive data from a larger storage array in the back-end of a server array. Either type of drive will read the data out to the main system memory which, in turn, through a direct memory access (DMA) channel forwards the data to the LFB. While functional, this process has drawbacks in the form of multiple protocol and data format conversions and many hops from one station to another within the computer system, adding latencies and potential bus congestion. In other words, the current challenge in systems used to perform big data analytics is that their performance is no longer defined by the computational resources but rather by the I/O limitations of the systems.

Another difference compared to current mainstream computing is that the data made available to GPGPUs are often not modified. Instead they are loaded and the computational analysis generates a new set of data in the form of additional paradigms or parameters that can be applied against specific aspects or the whole of the original data set. However, the original data are not changed since they are the reference and may be needed at any later time again. This changes the prerequisites for SSDs serving as last tier storage media before the data are loaded into a volatile memory buffer. Specifically with respect to loading the data into the SSD, most of the transactions will be sequential writes of large files, whereas small, random access writes could be negligible. In the case of data reads to the LFB, a mixed load of data comprising large sequential transfers and smaller transfers with a more random access pattern are probably the most realistic scenario.

As previously noted, a particular characteristic of big data analytics is its unstructured or semi-structured nature of information. Unlike structured information, which as used herein refers to relational database ordered in records and arranged in a format that database software can easily process, big data information is typically in the form of raw sets of mixed objects, for example, MRI images, outputs of multiple sensors, video clips, and so on. Each object contains a data part, e.g., a bitmap of the MRI image, and a metadata part, e.g., description of the MRI image, information about the patient, MRI type, and diagnosis.

The massive amount of data gathered and subjected to analytics typically requires a distributed processing scheme. That is, the data are stored in different nodes. However, each node in the system can process data from any other node. In other words, the storage is accumulated within the nodes' capacity and the processing power is spread across all nodes, forming a large space of parallel processing.

Funneling all data through the PCIe root complex of a host system may eventually result in bus contention and delays in data access. Specifically, in most current approaches, data are read from a solid state drive to the volatile system memory, then copied to a second location in the system memory pinned to the GPU, and finally transferred via the PCIe root complex to the graphics expansion card where the data are stored in the LFB. Alternatively, a peer-to-peer data transfer can be used to transfer data directly from one device to another but it still has to pass through the PCIe root complex. Similar constraints are found in modern gaming applications where texture maps are pushing the boundaries of the LFB of gaming graphics expansion cards. US patent application 2011/0292058 discloses a non-volatile memory space assigned to an Intel Larrabee (LRB)-type graphics processor for fast access of texture data from the SSD as well as a method for detection whether the requested data are in the non-volatile memory and then arbitrating the access accordingly.

Given the complexity and lack of optimization of the above discussed data transfer scheme between non-volatile storage and the local on-board volatile memory of a graphics expansion card, including all latencies and possible contentions at any of the hops between the origin in the SSD and the final destination in the LFB, it is clear that more efficient storage and processing systems are needed for performing big data analytics.

BRIEF DESCRIPTION OF THE INVENTION

The current invention discloses highly efficient architectures and methods for performing big data analytics by providing an integrated storage/processing system containing non-volatile memory devices that form a large, non-volatile memory array and a graphics processing unit (GPU) configured for general purpose (GPGPU) computing. The non-volatile memory array is "local" to the GPU, which as used herein means that the array is directly functionally coupled with the GPU and optionally is mounted on the same board (on-board) as the GPU. Non-limiting examples of such direct functional coupling may include a flash controller with a DDR compatible interface, a non-volatile memory controller integrated into the GPU and working in parallel to the native DDR controller of the GPU, or a PCIe-based interface including a PCIe switch.

According to a first aspect of the invention, the local non-volatile memory array may be functionally equivalent to a large data queue functionally coupled to the GPU. The GPU may be a stand-alone graphics processing unit (GPU) or a hybrid processing unit containing both CPU and GPU cores (commonly referred to as an "advanced" processing unit (APU)), for example, containing CPU cores in combination with an array of GPU cores and an optional PCIe root complex. In either case, the GPU is mounted on a processor expansion card, for example, a PCIe-based processor expansion card, which further includes an on-board (local) volatile memory array of volatile memory devices (preferably fast DRAM) as a local frame buffer (LFB) that is functionally integrated with the GPU. In addition, however, the GPU is also functionally coupled to the aforementioned local non-volatile memory array, provided as a local array of the non-volatile memory devices capable of storing large amounts of data and allowing direct low-latency access thereof by the GPU without accessing a host computer system in which the processor expansion card is installed. The non-volatile memory devices are solid-state devices, for example, NAND flash integrated circuits or another nonvolatile solid-state memory technology, and access to the local non-volatile memory array is through a non-volatile memory controller (for example, a NAND flash controller), which can be a direct PCIe-based memory controller or a set of integrated circuits, for example, a PCIe-based SATA host bus controller in combination with a SATA-based flash controller.

In a first embodiment, an integrated storage/processing system includes the processor expansion card (including the GPU and on-board (local) volatile memory array as LFB), and the processor expansion card is PCIe-based (compliant) and functionally coupled to a PCIe-based solid state drive (SSD) expansion card comprising the local non-volatile memory array. The processor expansion card and SSD expansion card are functionally coupled by establishing a peer-to-peer connection via an I/O (input/output) hub on a motherboard of the host computer system to allow access of data stored in the non-volatile memory devices by the GPU without accessing memory of the host computer system by peer-to-peer transfer of PCIe protocol based command, address and data (CAD) packets.

In a second embodiment of the invention, the processor expansion card may be one of possibly multiple PCIe-based processor expansion cards, each with a GPU and an on-board (local) volatile memory array (as LFB) that are functionally integrated with the GPU. In addition, one or more PCIe-based SSD expansion cards comprise the non-volatile memory devices that constitute one or more local non-volatile memory arrays. The processor expansion card(s) and the SSD expansion card(s) are connected to a daughter board having PCIe expansion sockets to accept PCIe-based expansion cards. Each PCIe expansion socket comprises a PCIe connector coupled to multiple parallel PCIe lanes, each constituting a serial point-to-point connection comprising differential pairs for sending and receiving data. The PCIe lanes coupled to the PCIe connectors for the processor expansion cards are connected to a PCIe switch, which is coupled by another set of PCIe lanes to one or more PCIe edge connectors adapted to be inserted into PCIe expansion slots of a motherboard of the host computer system. A technical effect of this approach is that, by linking a processor expansion card and SSD expansion card via the switch, faster throughput is achieved as compared to a link through a chipset input/output hub (IOH) controller containing a PCIe root complex.

In a third embodiment of the invention, in addition to the GPU functionally integrated with the on-board (local) volatile memory array (as LFB), the processor expansion card comprises the local non-volatile memory array and non-volatile memory controller therefor, in which case the local array can be referred to as an on-board non-volatile memory array with respect to the processor expansion card. The processor expansion card comprises a PCIe connector that defines multiple parallel PCIe lanes constituting an interface for the processor expansion card with the host computer system. Of the total number of PCIe lanes, a first group of the PCIe lanes is directly connected to the GPU and a second group of the PCIe lanes is connected to the memory controller. The GPU is capable of executing virtual addressing of the non-volatile memory devices of the on-board non-volatile memory array through a direct interface between the GPU and the memory controller.

An alternative option with the third embodiment is that, of the PCIe lanes constituting the interface of the processor expansion card with the host computer system, a first group of the PCIe lanes couples the GPU to the host computer system, and a second group of the PCIe lanes is coupled to a PCIe switch connected to the non-volatile memory controller and the GPU, wherein the PCIe switch functions as a transparent bridge to route data from the host computer system to the non-volatile memory controller or the GPU, or from the non-volatile memory controller to the GPU.

As another alternative option with the third embodiment of the invention, of the PCIe lanes constituting the interface of the processor expansion card with the host computer system, a functionally unified group of PCIe lanes is routed through a PCIe switch and then arbitrates across different modes of endpoint connections based on modes defined as address ranges and directionality of transfer. Such modes preferably include host-to-GPU, host-to-SSD, and SSD-to-GPU coupling.

Certain aspects of the invention include the ability of the processor expansion card to use a hybrid processing unit comprising CPU and GPU cores as well as an integrated PCIe root complex, system logic and at least one integrated memory controller. The on-board volatile memory array of volatile memory devices (as LFB) may use dual inline memory modules (DIMMs) and the local non-volatile memory array of non-volatile memory devices is addressed via the PCIe root complex integrated into the APU. The PCIe root complex may have two separate links of different width, for example a wide link of sixteen PCIe lanes and a narrow link of four PCIe lanes. The CPU cores can also run virtual machines. The processor expansion card may use a non-transparent bridge (NTB) to interface with the host computer system.

In the various embodiments discussed above in which the local non-volatile memory array and memory controller are integrated onto the processor expansion card (i.e., onboard) with the GPU, the memory controller can be dual ported and adapted to receive data directly from a host computer system as well as transfer data directly to the on-board GPU of the processor expansion card. The local non-volatile memory array acts as a queue or first-in-first-out buffer for data transferred from the host computer system to the integrated storage/processing system.

Also in the various embodiments discussed above, the GPU may have a graphics port adapted to transfer data to a second host computer system.

In yet another specific aspect of the invention, the memory controller implements the NVM Express standard (NVMe), formerly known as Enterprise non-volatile memory host controller interface (NVMHCI), a specification for accessing SSDs over a PCIe channel. As NVM Express supports up to 64K queues, it allows at least one queue (and preferably more) to be assigned to each GPU core of the GPU, thus achieving true parallel processing of each core with its appropriate data. Alternatively, the memory controller may implement an STA's (SCSI Trade Association) SCSI express standard for SCSI commands over a PCIe channel, or may implement another proprietary or standard interface of flash or SCSI commands over a PCIe channel for use with flash based storage, or may an object storage protocol—OSD version 1, OSD version 2 or any proprietary object storage standard. Furthermore, the memory controller may implement one of the above interfaces with additional non-standard commands. Such commands can be key-value commands for an associative array (or hash table) search as defined in a Memcached API (application programming interface). Another example of such an API can be a cache API with Read Cache, Write Cache and Invalidate directives.

According to another aspect, the invention comprises a method for efficient big data analytics using a GPU and an on-board (local) volatile memory array of volatile memory devices as a local frame buffer (LFB) integrated together with a local non-volatile memory array on a PCIe-based expansion card. Data are loaded from the non-volatile memory array into the LFB without being intermittently stored in the system memory and processed by parallel execution units of the GPU. As with other embodiments of the invention, the GPU may be a graphics processing unit (GPU) or a hybrid processing unit (APU) containing both CPU and GPU cores.

According to still another aspect of the invention, a method is provided for distributed analytics of big data using a cluster of several client machines, each client machine having a PCIe-based expansion card with a GPU and a local non-volatile memory array. Each client machine is attached to a network-attached-storage array via Ethernet, fiber channel or any other suitable protocol for loading data into non-volatile memory devices of the local non-volatile memory array. The GPU performs big data analytics on data loaded into the non-volatile memory devices, and results of the analytics are output through a graphics port or media interface on the expansion card and transferred to a host computer system.

Other aspects of the invention will be better understood from the following detailed description.

DETAILED DESCRIPTION OF THE INVENTION

The present invention is targeted at solving the bottleneck shift from computational resources to the I/O subsystem of computers used in big data analytics. Conventional solutions using GPGPU computing are data starved in most cases since the storage system cannot deliver data at a rate that makes use of the processing capabilities of massive parallel stream processors, for example, the CUDA (compute unified device architecture) parallel computing architecture developed by the nVidia Corporation. Though the adding of additional solid state drives (SSDs) to function as prefetch caches ameliorates the problems, this approach is still slowed by latencies and a sub-optimal implementation of a streamlined direct I/O interface connected to graphics processing units with enough storage capacity to hold large data sets at a reasonable cost and power budget.

Figure 1:
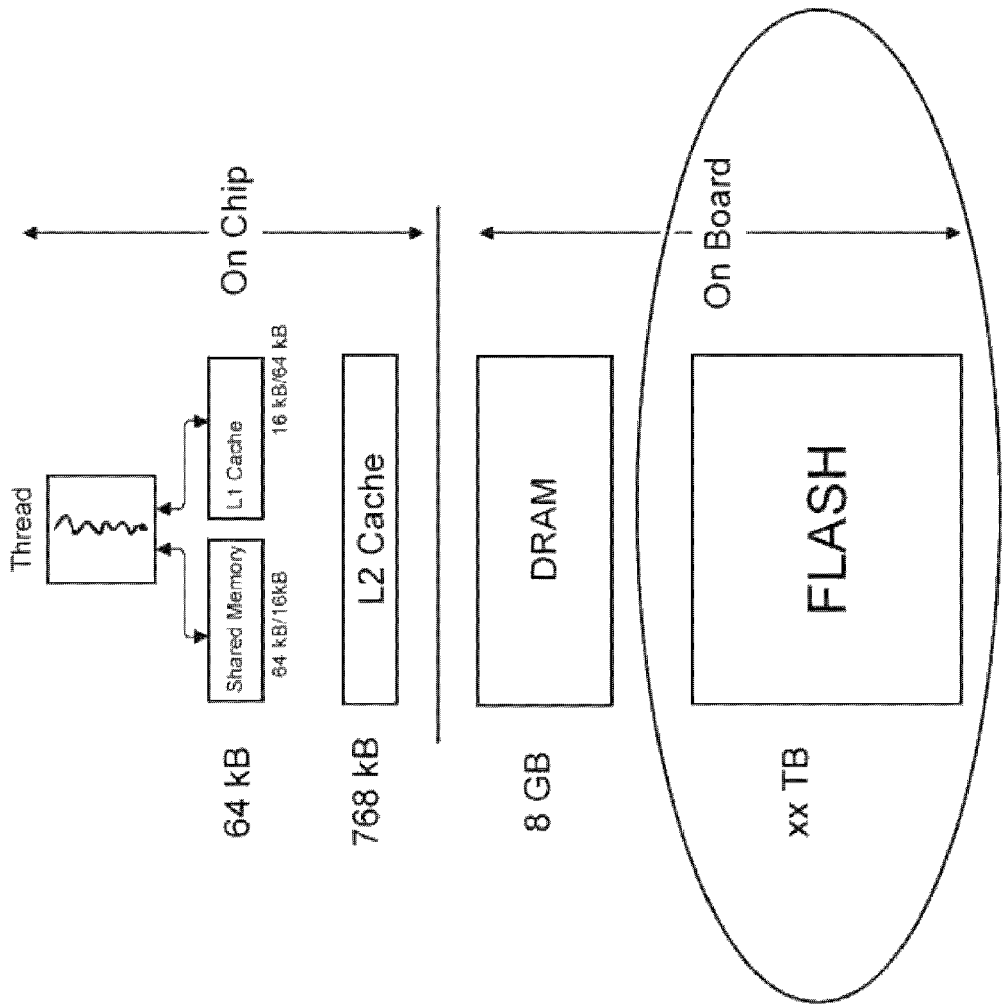
FIG. 1 schematically represents an embodiment of an integrated storage/processing device of the invention in which a large local (on-board) flash memory array is combined with volatile (DRAM) memory on an expansion card FIG. 2 schematically represents a system architecture of a type commonly used in the prior art for interfacing a discrete graphics expansion card having a GPU and a DRAM-based local frame buffer (LFB) with a host computer system having a SATA-based SSD.

To overcome these problems, the present invention provides integrated storage/processing systems and devices that are configured to be capable of efficiently performing big data analytics. Such a system can combine a graphics processing unit (GPU) configured for general purpose (GPGPU) computing with a directly-attached (local) array of non-volatile memory devices that may be either integrated onto a device with a GPGPU (on-board) or on a separate device that is directly functionally coupled with a GPGPU (local but not on-board) via a dedicated micro-architecture that may comprise an interposed daughter card. As used herein, the term "GPGPU" is used to denote a stand-alone graphics processing unit (GPU) configured for general purpose computing, as well as hybrid processing units containing both CPU and GPU cores and commonly referred to as "advanced" processing units (APUs). A nonlimiting embodiment of an integrated storage/processing device equipped with an on-board volatile memory array of volatile memory devices (for example, "DRAM" memory devices) and an on-board non-volatile memory array of non-volatile memory devices is schematically represented in FIG. 1. For illustrative purposes, the integrated storage/processing device illustrated in FIG. 1 is based on an existing Nvidia Fermi memory hierarchy to which the non-volatile memory array has been added, though the invention is not limited to this configuration. The non-volatile memory devices are solid state memory devices and, as indicated in FIG. 1, can be flash memory devices ("FLASH") and preferably NAND flash memory devices, though any other suitable, high-capacity non-volatile memory technology may be used. The memory capacity of the non-volatile memory array is preferably terabyte-scale.

The following discussion will make reference to FIGS. 1 through 19, of which FIGS. 1 and 4 through 19 depict various embodiments of integrated storage/processing systems and devices that are within the scope of the invention. For convenience, consistent reference numbers are used throughout the drawings to identify the same or functionally equivalent elements.

Figure 2:
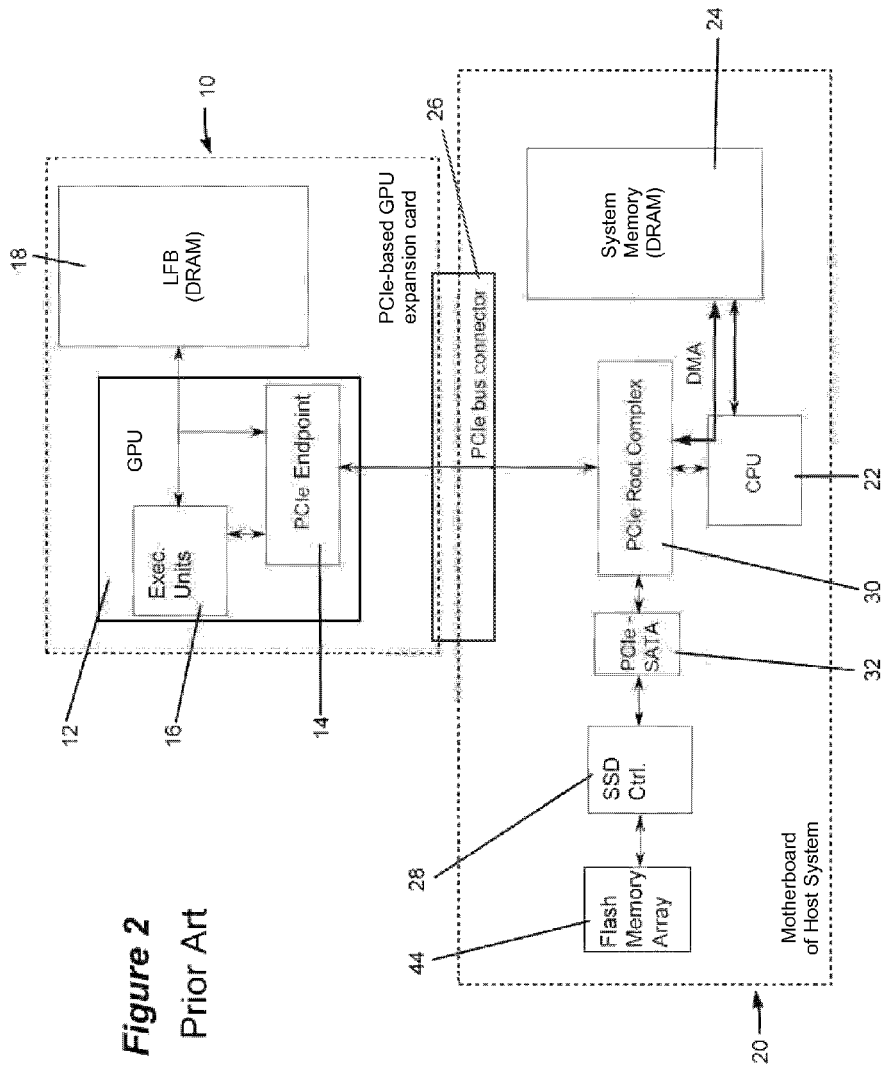
Figure 3:
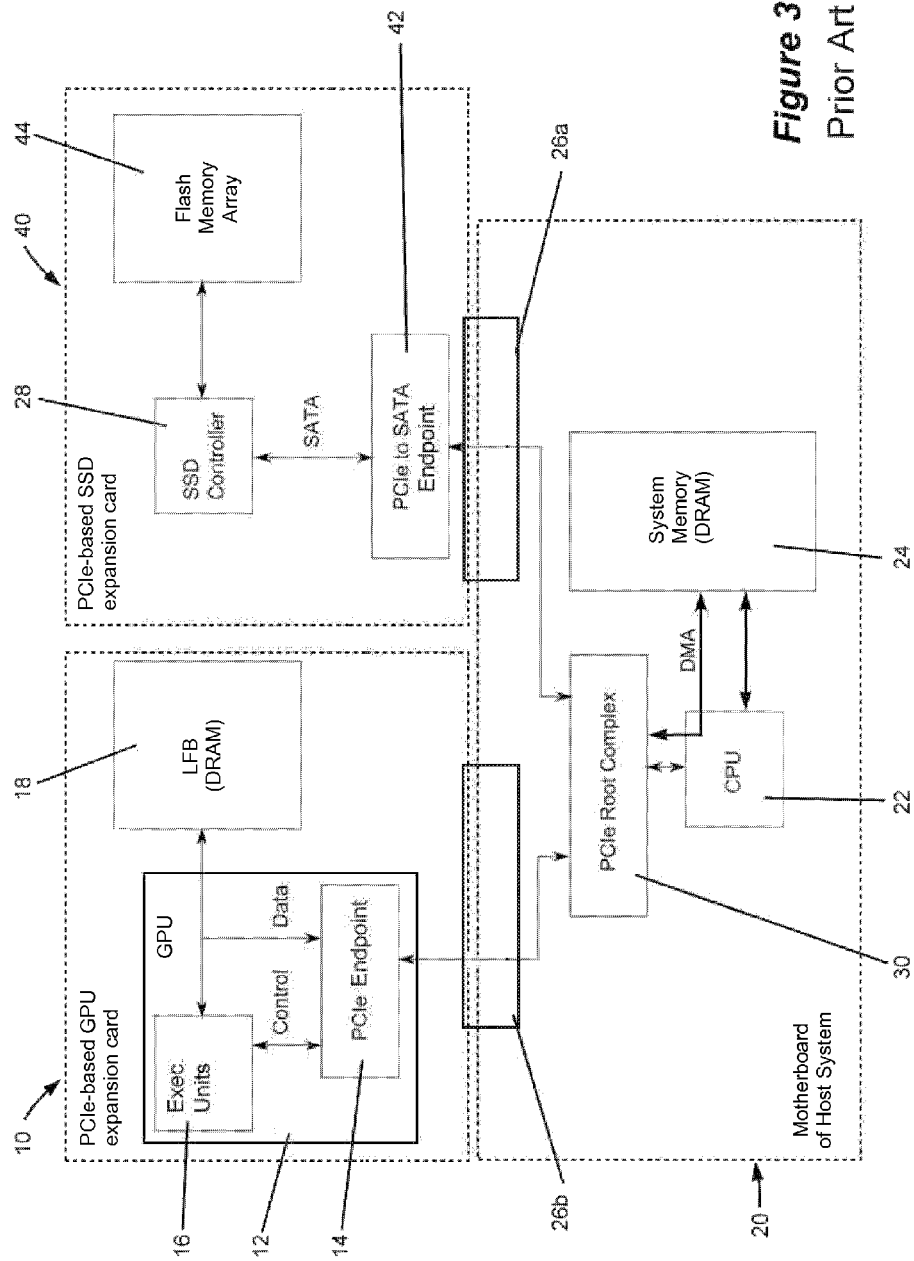
FIG. 3 schematically represents a more advanced system architecture of a type used in the prior art, in which a PCIe-based graphics expansion card is used in combination with a PCIe-based solid state drive (SSD).

As a point of reference, FIGS. 2 and 3 represent examples of existing system architectures used for GPGPU computing. Current system architectures of the type shown in FIG. 2 are typically configured as a high-end PCIe-based graphics expansion card 10 adapted to be installed in an expansion slot (not shown) on a motherboard (mainboard) 20 (or any other suitable printed circuit board) of a host computer system (for example, a personal computer or server). The expansion card 10 includes a GPU 12 having a PCIe endpoint 14 and execution units 16, and a large DRAM-based local frame buffer (LFB) 18. The expansion card 10 is functionally coupled via a PCIe bus connector (interface) 26 (generally part of the expansion bus of the motherboard 20) to interface with a PCIe root complex 30 on the motherboard 20. A DMA (Direct Memory Access) channel allows for direct transfer of data from an array of DRAM-based system memory 24 on the motherboard 20 to the LFB 18 on the graphics expansion card 10 through a central processing unit (CPU) 22 on the motherboard 20. Local data storage is provided by a solid state drive (SSD), represented in FIG. 2 as comprising a flash memory array 44 and a SSD controller 28, which interfaces with a SATA host bus adapter 32 connected to the PCIe root complex 30 for low latency access of data stored in flash memory devices of the memory array 44. Alternatively, a hard disk drive using rotatable media can be used for local data storage, with the inherent trade-off between data capacity and access latency and bandwidth.

A more advanced system architecture known in the art and illustrated in FIG. 3 uses a dedicated PCIe-based SSD expansion card 40 having a PCIe to SATA endpoint 42 functionally coupled to a SATA SSD controller 28 which, in turn, is coupled to a flash memory array 44. The expansion card 40 interfaces with the host computer system motherboard 20 through a first group of PCIe lanes via a first PCIe connector 26a. This particular architecture has the advantage of bypassing the limitation of a single SATA interface with respect to bandwidth. However, the data still need to be transferred from the SSD expansion card 40 to the host system PCIe root complex 30. The graphics expansion card 10 uses a second set of PCIe lanes via a second PCIe connector 26b to interface with the PCIe root complex 30 on the motherboard 20. With this configuration, a peer-to-peer transfer would require copying the data to the system memory 24, in which case they would then need to be copied again into a memory range pinned to the GPU 12 before being transferred through a second group of PCIe lanes to the graphics expansion card 10.

Figure 4:
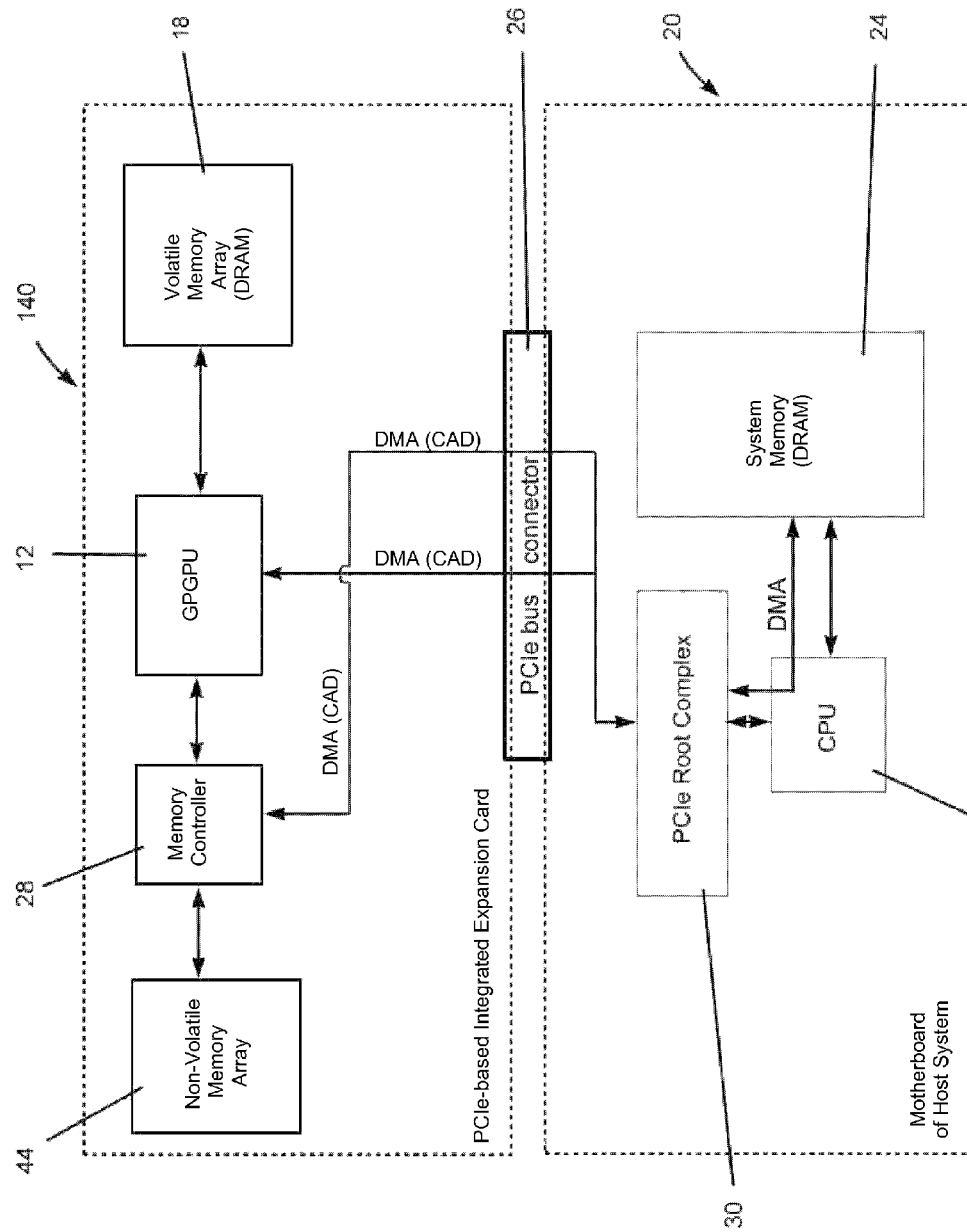
FIG. 4 schematically represents a high-level overview representing an integrated storage/processing system that includes a motherboard (mainboard) having a shared PCIe bus connector (interface) coupled to a PCIe-based expansion card on which is integrated a graphics processing unit (GPU) configured for general purpose (GPGPU) computing, a volatile memory array (DRAM), and a non-volatile memory array, as may be implemented with various embodiments of the present invention.

FIG. 4 provides a high-level schematic overview of interconnectivity for implementation of an integrated storage/processing system comprising a PCIe-based integrated expansion card (board) 140 corresponding to the integrated storage/processing device of FIG. 1. Similar to the conventional system architectures represented in FIGS. 2 and 3, the system of FIG. 4 includes a motherboard (mainboard) 20 (or any suitable printed circuit board) of a host computer system (not shown), for example, a personal computer or server. The motherboard 20 is represented in FIG. 4 as comprising a CPU 22, DRAM-based system memory 24 addressable by the CPU 22 and configured for direct memory addressing (DMA) by peripheral components through a PCIe root complex 30 integrated on the motherboard 20, and a PCIe bus connector (interface) 26 (generally part of the expansion bus of the motherboard 20) for functionally and electrically coupling peripheral components with the PCIe root complex 30. In addition, the PCIe-based integrated expansion card 140 shares certain similarities with the expansion cards 10 or 40 of FIGS. 2 and 3, for example, an on-board volatile memory array (as LFB) 18, for example, an array of DRAM-based volatile memory devices, functionally coupled with a processor 12. The processor 12 in FIG. 4 is designated as a "GPGPU," though it will be appreciated from the following that the processors 12 identified in FIGS. 4-18 may be a stand-alone GPU configured for general purpose (GPGPU) computing and have a PCIe endpoint, or a hybrid processing unit that contains both CPU and GPU cores and has an integrated PCIe root complex, in which case the processor 12 can be referred to as an APU and may contain, as a nonlimiting example, x86 or equivalent CPU cores in combination with an array of GPU cores. If the processor 12 is an APU with an integrated PCIe root complex, the motherboard's PCIe root complex 30 and the PCIe root complex on the integrated expansion card 140 are preferably separated by a non-transparent bridge (NTB) or PCIe switch (not shown).

The processor 12 of the integrated expansion card 140 is further represented as functionally coupled to a local on-board non-volatile memory array 44 of non-volatile memory devices capable of storing large amounts of data and allowing direct low-latency access thereof by the processor 12 without accessing the motherboard 20 of the host computer system in which the integrated expansion card 140 is installed. The non-volatile memory array 44 preferably contains solid-state memory devices, for example, NAND flash memory devices, though the use of other non-volatile solid-state memory technologies is also within the scope of the invention. The memory array 44 is accessed through a memory controller 28 having a PCIe endpoint, for example, a direct PCIe-based memory controller or a set of integrated circuits, for example, a PCIe-based SATA host bus controller in combination with a SATA-based flash memory controller. If the processor 12 is an APU, the memory controller 28 with its memory array 44 can be addressed through the APU's PCIe root complex. If the processor 12 is a standalone GPU, the memory controller 28 with its memory array 44 can be addressed through a GPU-Direct or a unified virtual addressing architecture. The memory controller 28 can further set up a DMA channel (not shown) to the on-board volatile memory array 18. Packets containing command, address, and data (CAD) are loaded from the motherboard 20 into the memory array 44 via the PCIe bus connector 26.

Figure 5:
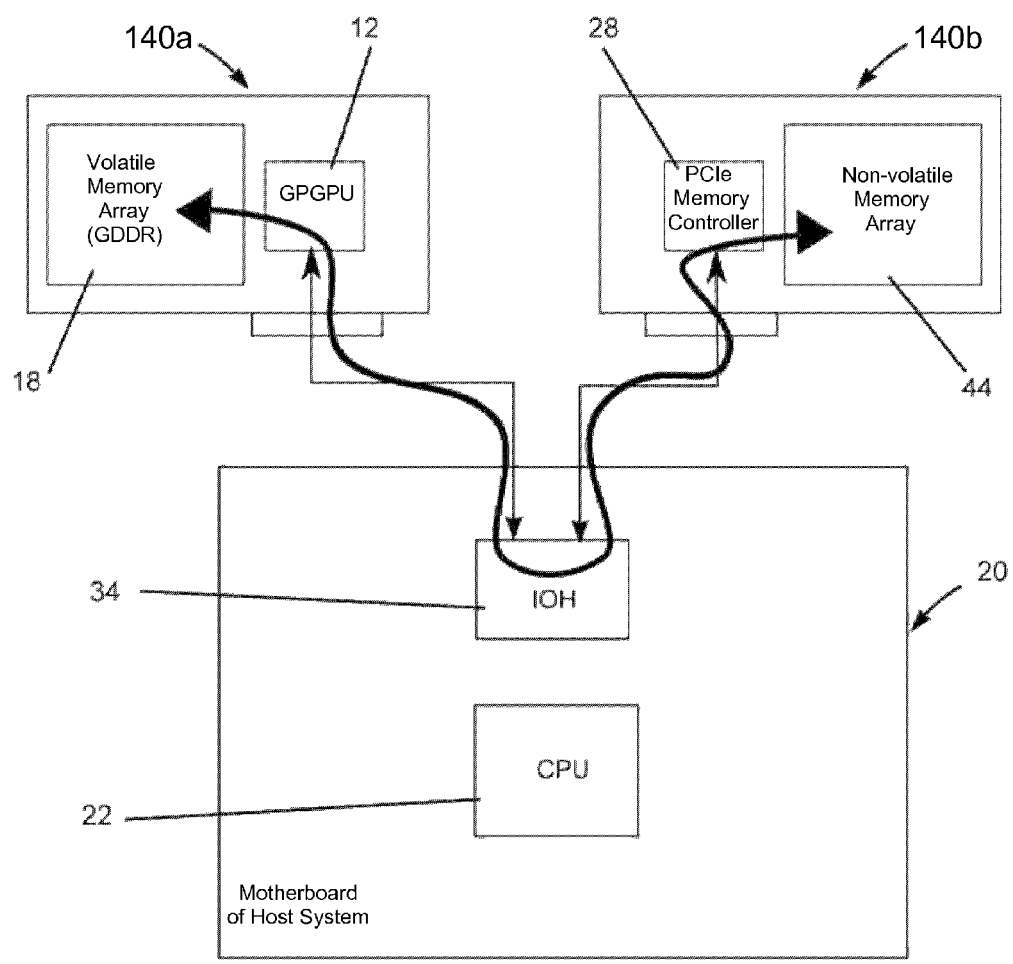
FIG. 5 schematically represents a high-level overview of an embodiment of an integrated storage/processing system of the invention that includes a motherboard coupled to a PCIe-based processor expansion card on which a volatile memory array (GDDR) and a GPU configured for general purpose computing are mounted, as well as coupled to a PCIe-based SSD expansion card on which a non-volatile memory array and a memory controller are mounted, and further represents an implementation of a shortcut communication between the processor expansion card and the SSD expansion card through an input/output hub (IOH) so that the non-volatile memory array is directly functionally coupled with the GPU through a peer-to-peer connectivity without the need to access the host system memory.

Conceptually, one of the easiest implementations of the architecture discussed above can rely on discrete graphics and SSD expansion cards but use a direct device-to-device data transfer scheme. FIG. 5 represents such a data transfer scheme between separate processor and SSD expansion cards 140a and 140b going through an I/O hub (IOH) 34 on a motherboard 20, such that the processor expansion card 140a (equipped with an on-board volatile memory array 18, for example, Graphic Double Data Rate (GDDR) memory) communicates with the SSD expansion card 140b (equipped with an on-board non-volatile memory array 44, for example, NAND flash memory) via peer-to-peer transfers through the IOH 34. However, depending on the exact hardware and software device driver specifications and/or licensing agreements between manufacturers of the motherboard 20, chipset, for example IOH 34, processor expansion card 140a, and SSD expansion card 140b, this particular mode of operation may not be supported broadly enough to gain ubiquitous acceptance.

Figure 6:
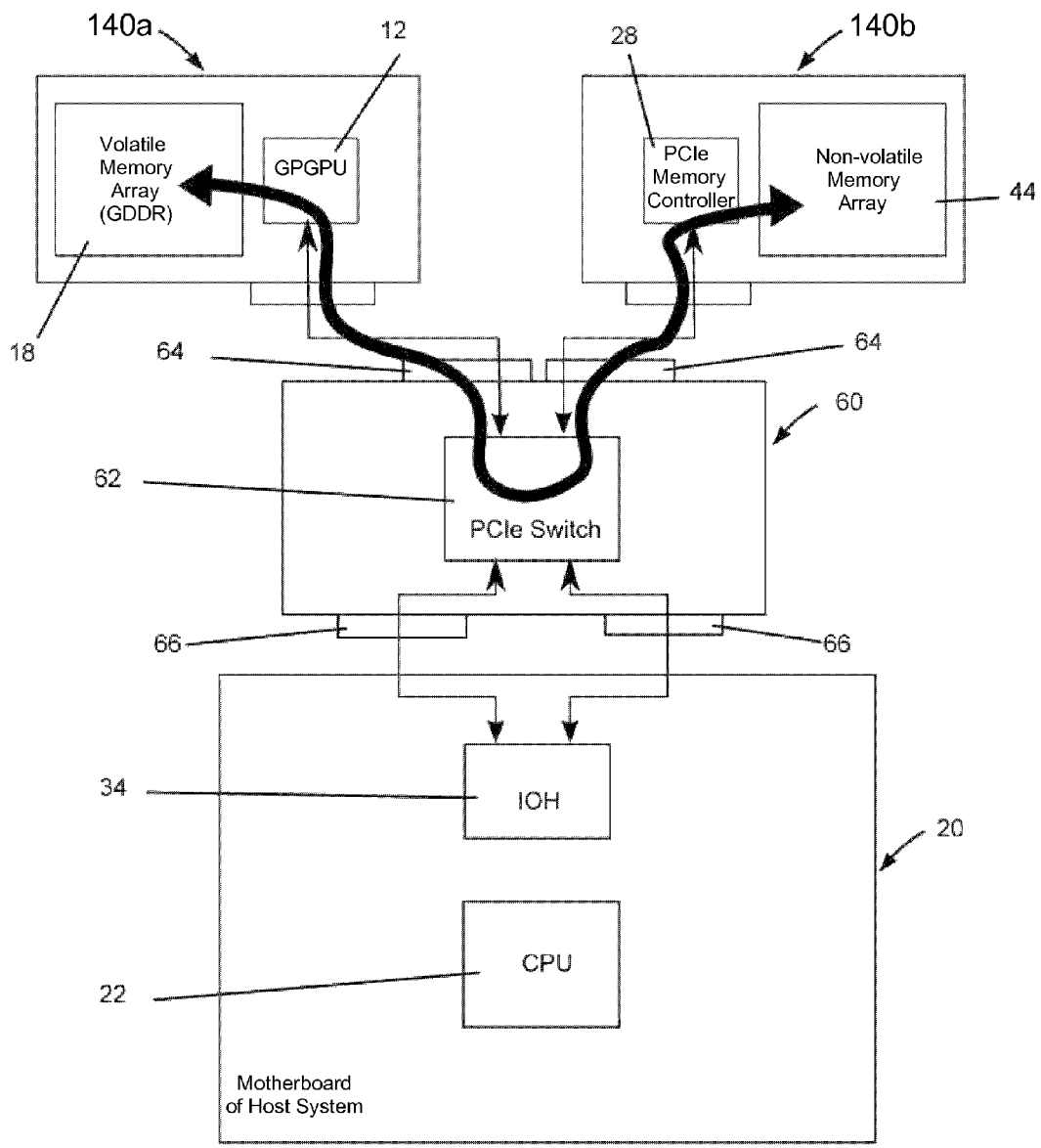
FIG. 6 schematically represents an embodiment similar to that of FIG. 5, but provides a host computer system-independent fast-track communication between the GPU on the processor expansion card and the non-volatile memory array on the SSD expansion card using an interposed PCIe switch on a daughterboard serving as interface between the host computer system and the processor and SSD expansion cards and thereby avoiding the bottlenecks presented by slower performing 10H hubs.
Figure 7:
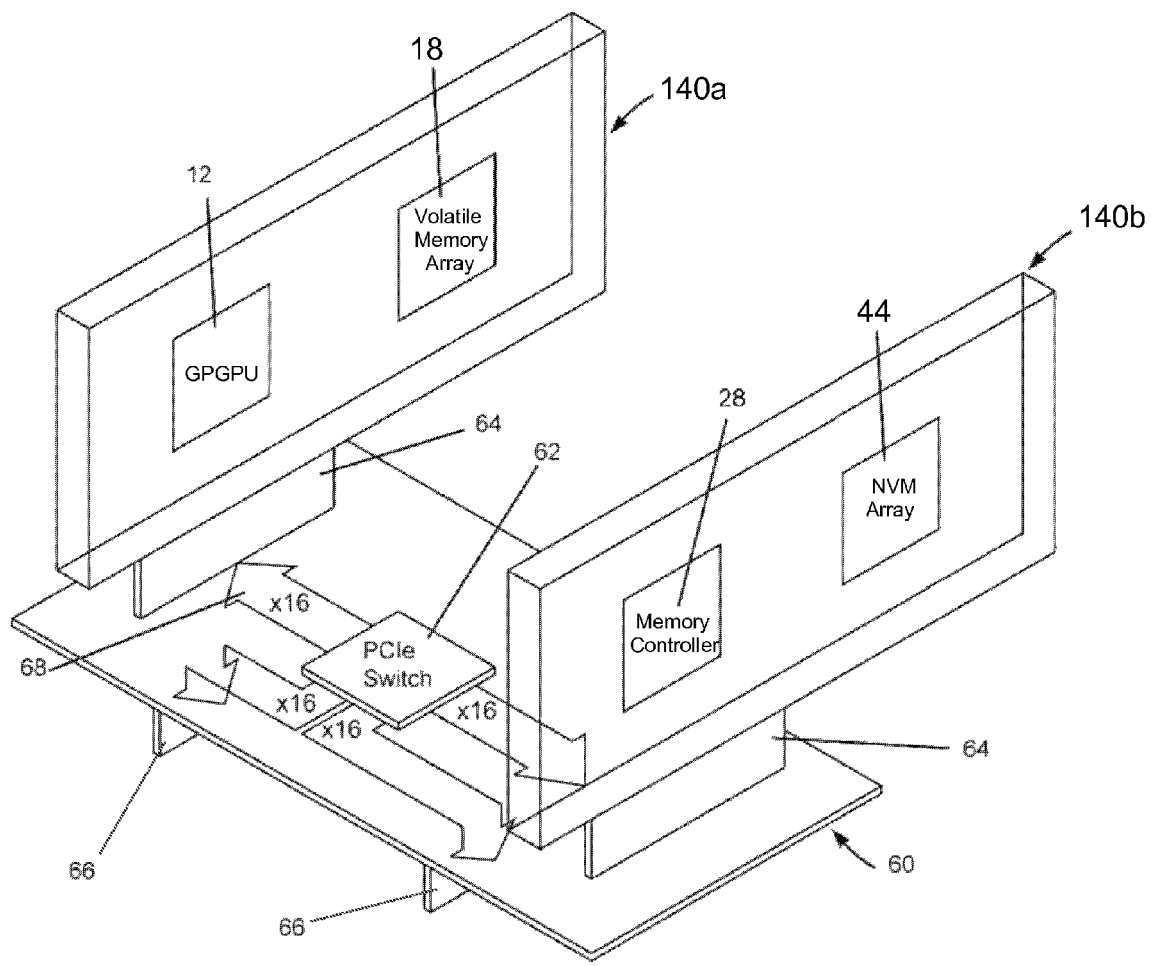
FIG. 7 schematically represents a possible embodiment of the daughter board of FIG. 6 wherein the PCIe switch is coupled to PCIe edge connectors to be inserted into the motherboard of a host computer system.

An alternative solution bypassing the aforementioned technical and logistical problems is to insert a PCIe expansion micro-architecture as schematically represented in FIG. 6 and represented by a possible physical embodiment in FIG. 7. Instead of relying on the IOH 34 on the motherboard 20 as done in FIG. 5, the microarchitecture of FIG. 6 further comprises an expansion or daughter board 60 with a PCIe switch 62 to allow direct communication between the PCIe-based processor and SSD expansion cards 140a and 140b. The PCIe switch 62 is preferably a transparent bridge that is functionally coupled to the IOH 34 located on the motherboard 20, however, peer-to-peer traffic is routed though the PCIe switch 62 which effectively doubles the bandwidth compared to traffic routed through the IOH 34 in FIG. 5.

The daughter board 60 has at least one PCIe edge connector 66 to be inserted into a PCIe slot (not shown) on the motherboard 20. Each edge connector 66 can establish a multi-lane PCIe link 68 to the PCIe switch 62 mounted on the daughter board 60, which also has two PCIe-based expansion slots (female connectors) 64 for insertion of the processor and SSD expansion cards 140a and 140b, shown as full-size expansion cards in the non-limiting example of FIG. 7. The processor expansion card 140a is a graphics expansion card featuring a processor (GPGPU) 12 and a volatile memory array 18, whereas the SSD expansion card 140b contains a non-volatile memory (NVM) array 44 and memory controller 28. The PCIe switch 62 allows peer-to-peer communication of the two expansion cards 140a and 140b or else communication of either expansion card 140a/140b with a host computer system through the PCIe edge connectors 66 with the motherboard 20.

While the above discussed implementations may provide a relatively easy approach to combine existing hardware for a streamlined GPGPU-SSD functional complex, the following discussion will be directed to the combination of both devices on a single expansion card 140, and example of which is the embodiment previously discussed in reference to FIG. 4.

Figure 8:
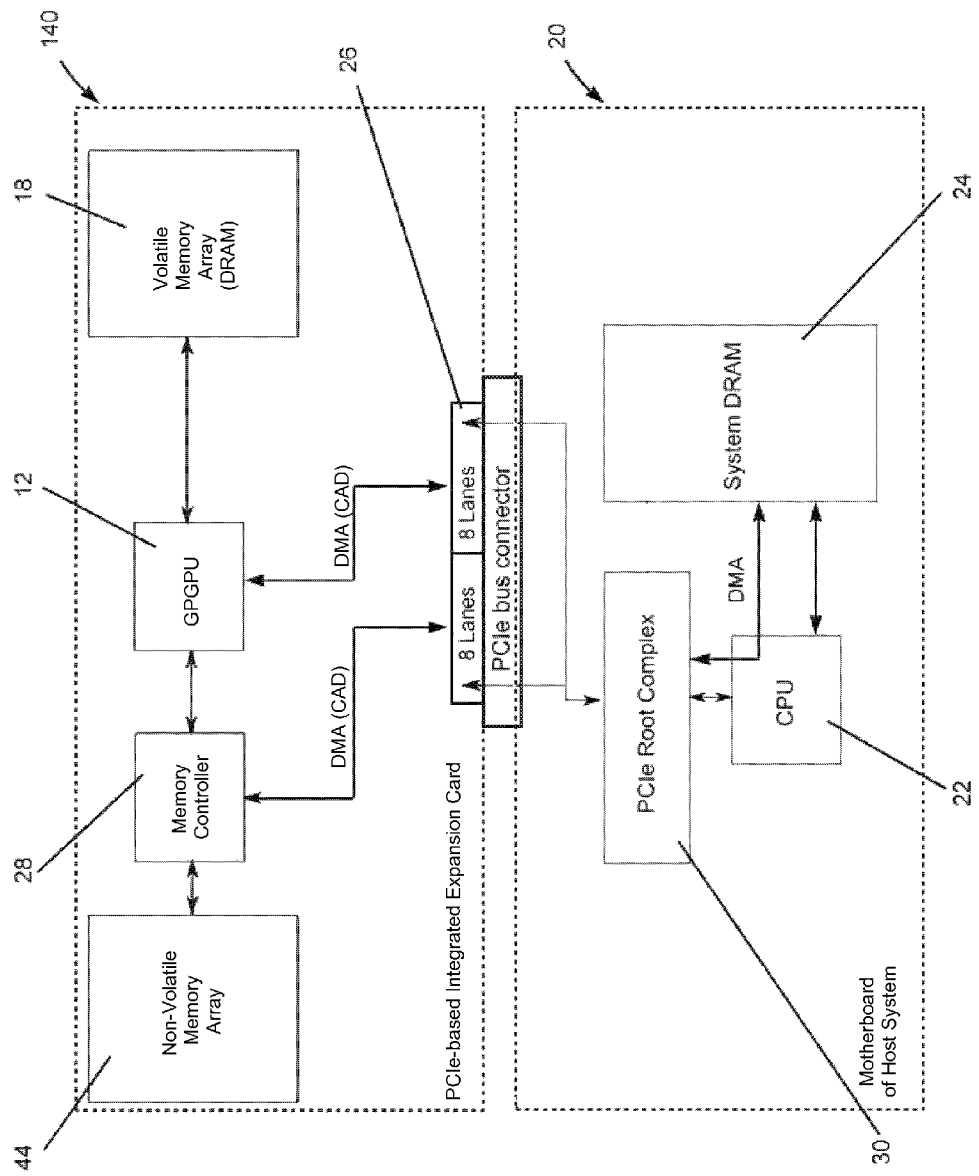
FIG. 8 schematically represents a system implementation of the invention similar to FIG. 4, but uses dedicated PCIe lanes to both the GPU and the memory controller on the PCIe-based expansion card and uses a direct-PCIe or GPU-direct interface between the GPGPU and memory controller.

In most cases, PCIe slots are configured to support one group of PCIe lanes with a single target device. However, the PCIe specifications also support multiple targets on a single physical slot, i.e., a split PCIe bus connector 26, an example of which is shown in FIG. 8. In the embodiment of FIG. 8, the processor 12 is represented as using one group of eight PCIe lanes of the connector 26 for command, address, and data (CAD) signals as well as for the DMA channel to the DRAM of the volatile memory array 18. A second group of eight PCIe lanes is coupled to the memory controller 28 in order to transfer data from the host computer system (not shown) to the non-volatile memory array 44. The memory controller 28 is configured to be recognized by the processor (GPGPU) 12 as a compatible device through a group of PCIe lanes of a direct-PCIe interface, a GPU-direct interface, or any similar access scheme. The embodiment of FIG. 8 can also make use of a DMA channel (not shown) from the memory controller 28 to the DRAM of the volatile memory array 18. Other specific access schemes or protocols are also possible.

Instead of using direct point-to-point communication as discussed above, the processor 12 may also request data from the non-volatile memory array 44 by sending the request to the host computer system. The host computer system then issues a ReadFPDMA or equivalent NVMExpress request to the memory controller 28 but sets up the target address range to be within the volatile memory array 18 of the processor 12.

Figure 9:
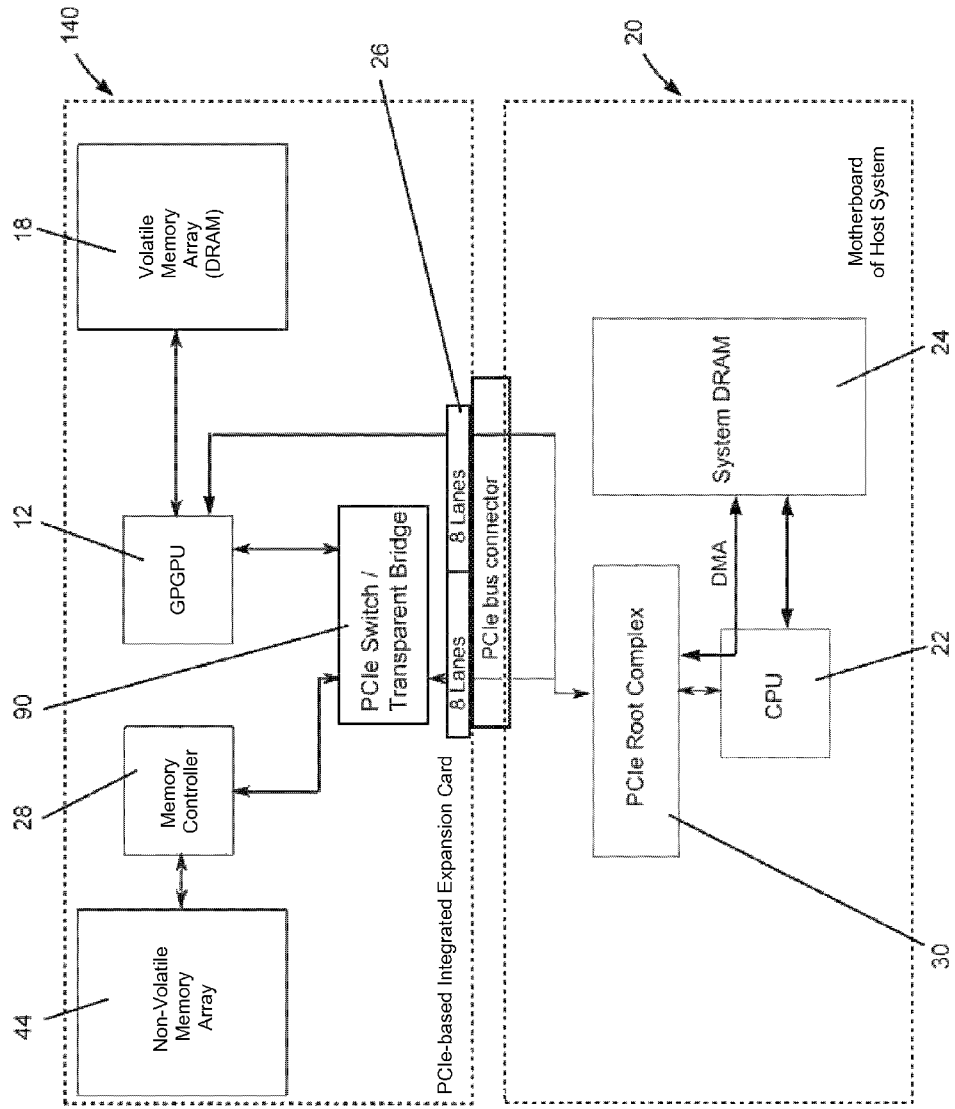
FIG. 9 schematically represents an implementation of the invention similar to FIG. 4, but with a split PCIe host interface supporting a dedicated GPU link and an additional link going through a PCIe switch/transparent bridge to arbitrate between the memory controller, the host computer system, and the GPU.

In a modified implementation shown in FIG. 9, the processor 12 uses a group of eight PCIe lanes of the split PCIe bus connector 26 as a dedicated PCIe link to establish a permanent and direct interface between the processor 12 and the PCIe root complex 30. A second group of eight PCIe lanes connects to a PCIe switch (PCIe switch/transparent bridge) 90. The PCIe switch 90 routes data and request signals (PCIe packets) over the PCIe lanes between the host computer system, the processor 12, and the memory controller 28 for transfer of PCIe packets between the host computer system and the processor 12, between the host computer system and the memory controller 28, and between the memory controller 28 and the processor 12. If the processor 12 requests a specific set of data, it sends a request to the host computer system, which in turn translates the request into a read request which is transferred to the memory controller 28 via the PCIe switch 90. As soon as the memory controller 28 is ready to transfer the data to the processor 12 and the DRAM of the volatile memory array 18, the memory controller 28 sets up a DMA channel through the PCIe switch 90 and streams the requested data into the volatile memory array 18. The host computer system then waits for the processor 12 to issue the next request or else, speculatively transfers the next set of data to the non-volatile memory array 44. In a more streamlined configuration, the memory controller 28 and processor 12 can transfer data directly through peer-to-peer transfers based on the address range of the destination memory array 44 using the switch 90 to set up the correct routing based on the addresses.

The processor 12 can return the result of the analytics directly to the host computer system via the PCIe bus connector 26. Alternatively, the processor 12 can also output the results of the data processing through any of the video ports such as DVI, HDMI or DisplayPort as non-limiting examples.

Figure 10:
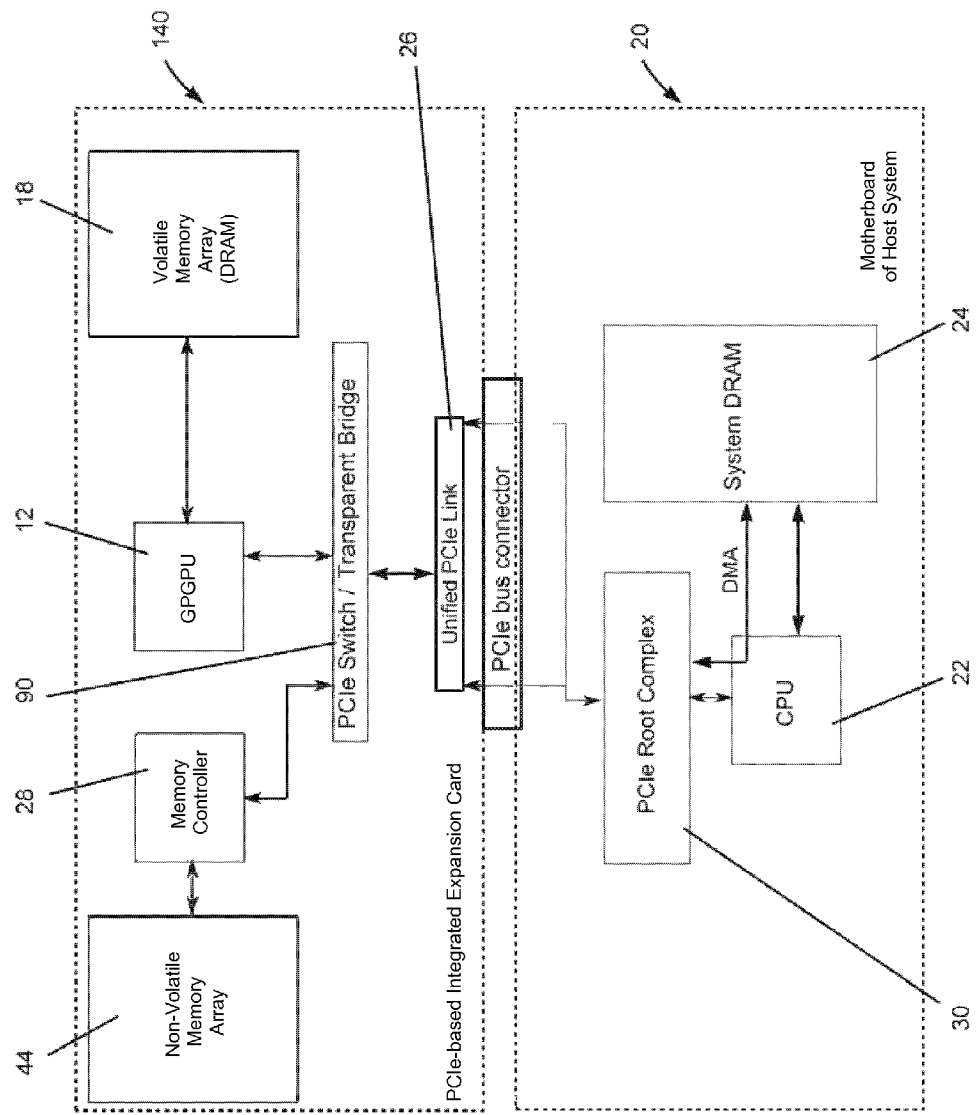
FIG. 10 schematically represents a system implementation of the invention similar to FIG. 4, but uses a unified PCIe link to a PCIe switch to arbitrate between the memory controller, the host computer system, and the GPU.

In a slightly simplified implementation shown in FIG. 10, all PCIe lanes of a PCIe bus connector 26 are used as a unified link and coupled to a PCIe switch 90 that arbitrates the coupling between a host computer system, memory controller 28 and processor 12 in a three-way configuration. Arbitration of connections may be done according to the base address registers (BAR) defining the address range of individual target devices (the processor 12 or memory controller 28). Similar as discussed above, the processor 12 can access the non-volatile memory controller through the PCIe switch 90 using GPU-Direct or a comparable protocol.

Figure 11:
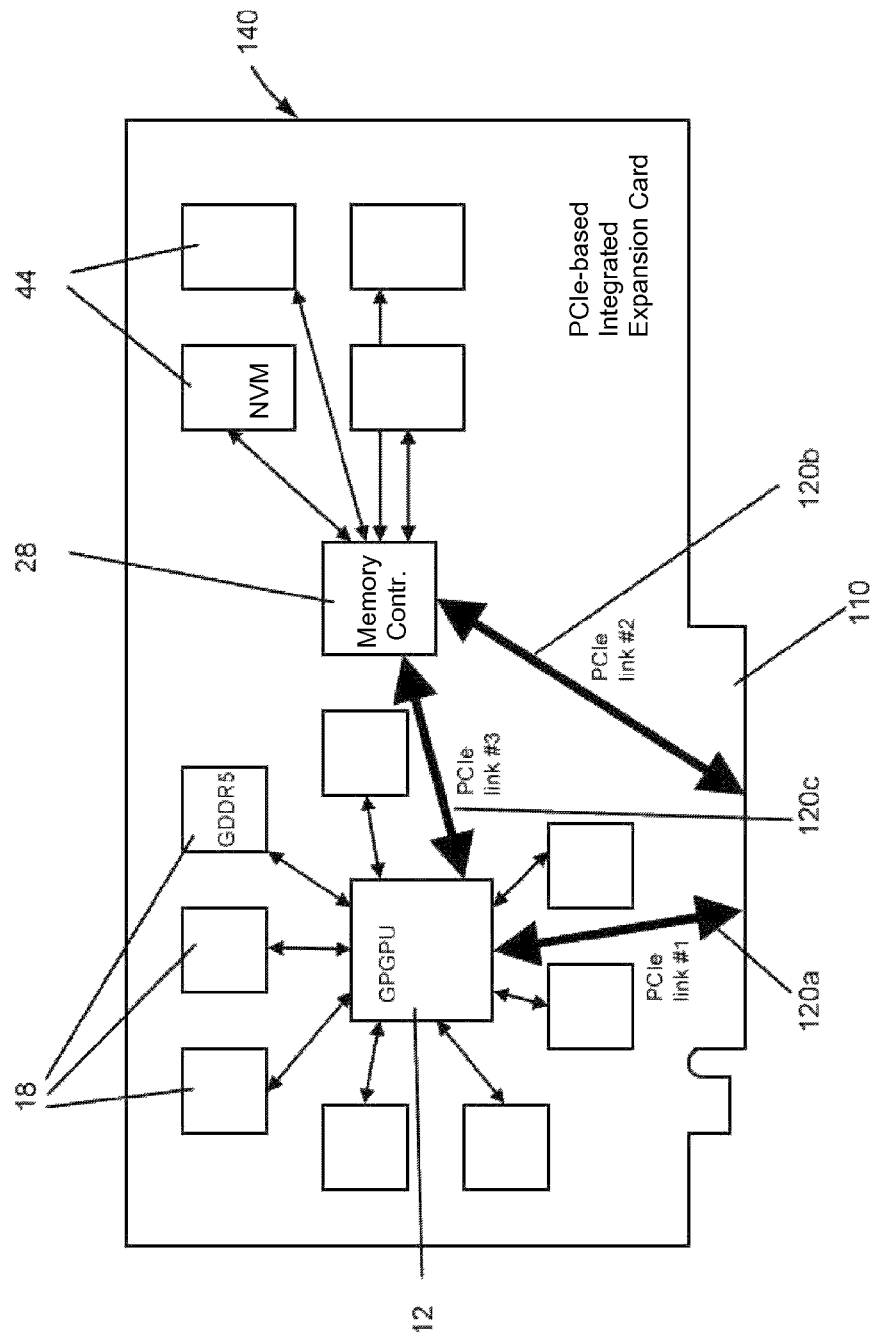
FIG. 11 schematically represents an embodiment of the PCIe-based expansion card of FIG. 8.

One particular embodiment of an expansion card 140 as discussed in reference to FIG. 8 is shown in FIG. 11. The expansion card 140 has a PCIe-compliant edge connector 110 adapted to interface with the host computer system's PCIe bus connector 26 (not shown). The edge connector 110 routes a first group of PCIe lanes, identified as PCIe link #1 120*a*, to the processor (GPGPU) 12 and a second group of PCIe lanes, identified as PCIe link #2 120*b*, to the memory controller 28. The processor 12 can directly access the memory controller 28 through a third group of dedicated PCIe lanes, identified as PCIe link #3 120*c*, between the processor (GPGPU) 12 and memory controller 28. In practice, the PCIe bus connector 26 at the host level may be sixteen lanes wide, of which eight PCIe lanes are dedicated to the processor 12 and the remaining eight PCIe lanes connect directly to the memory controller 28 to serve as an interface to the non-volatile memory (NVM) devices of the non-volatile memory array 44. The memory controller 28 may have a built-in PCIe bank switch (not shown) to select the eight PCIe lanes connected to the host PCIe bus connector 26 via the PCIe link #2 120*b*, or else select a second set of PCIe lanes (PCIe link #3 120*c*) that connect directly to the processor 12 depending on the address or command information received. Alternatively, the bank switch may also be controlled by the write vs. read command. That is, if a write command is received, the switch automatically connects to the host computer system whereas a read command will automatically connect to the processor 12. Another possible implementation of this design uses a memory controller 28 with an eight PCIe lanes-wide bus connector 26 which is split into four PCIe lanes connecting to the host computer system and four PCIe lanes connecting to the processor 12.

Figure 12:
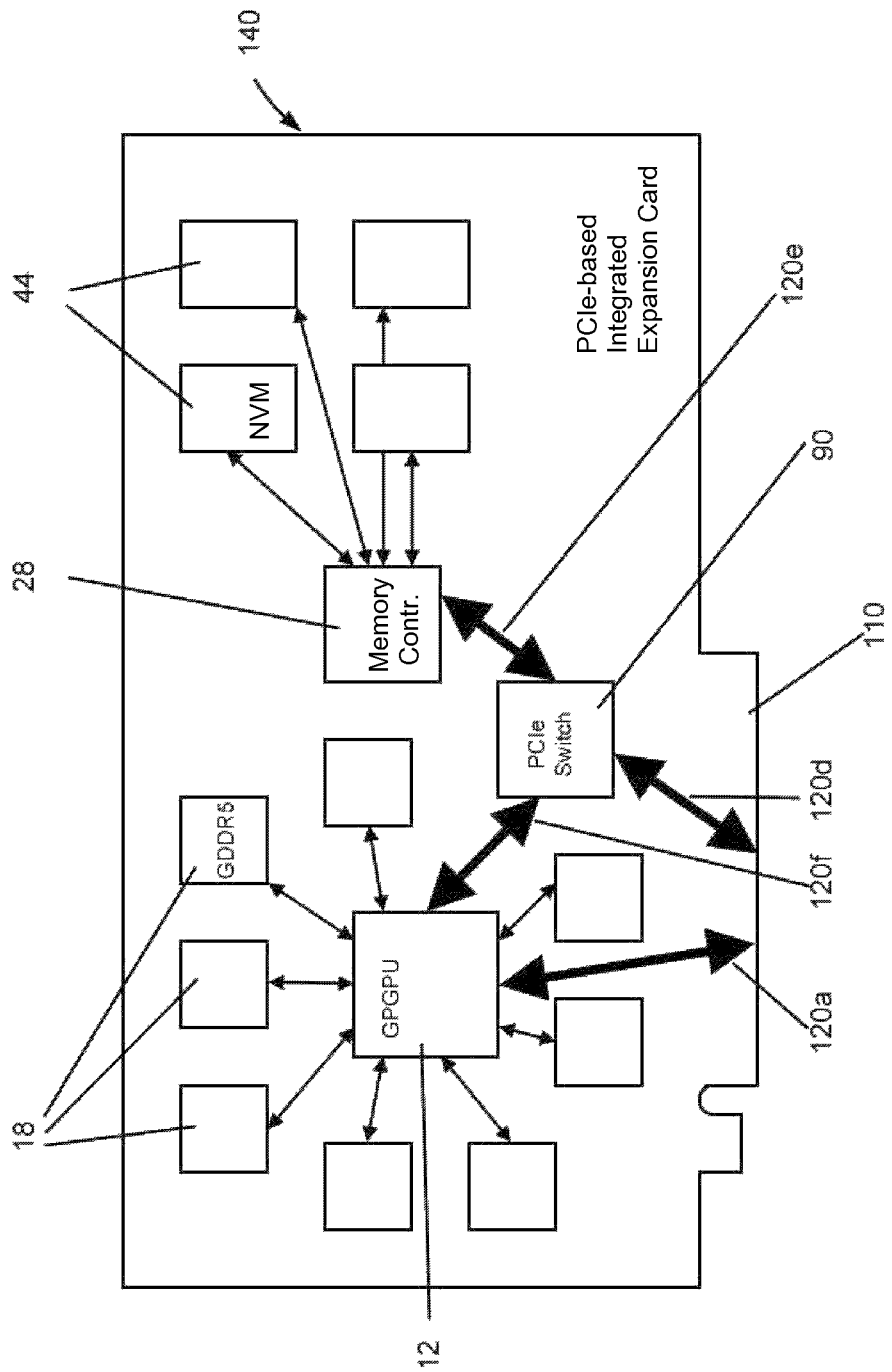
FIG. 12 schematically represents an embodiment of the PCIe-based expansion card of FIG. 9.

FIG. 12 schematically represents a particular embodiment of an expansion card 140 as discussed in reference to FIG. 9. The processor (GPGPU) 12 is represented as having its own dedicated set of PCIe lanes (link) to the host computer system via the PCIe edge connector 110 and, in addition, a separate link to a PCIe switch 90. The PCIe switch 90 arbitrates between host-to-memory controller data links (connections) 120*d* and 120*e* for transferring data from the host computer system to the non-volatile memory array 44 and GPU-to-memory data links 120*e* and 120*f* for transferring data from the memory controller 28 to the processor 12. The processor 12 is further coupled through a wide memory bus to a volatile memory array 18 comprising several high-speed volatile memory components, for example, GDDR5 (as indicated in FIG. 12) or DDR3.

Figure 13:
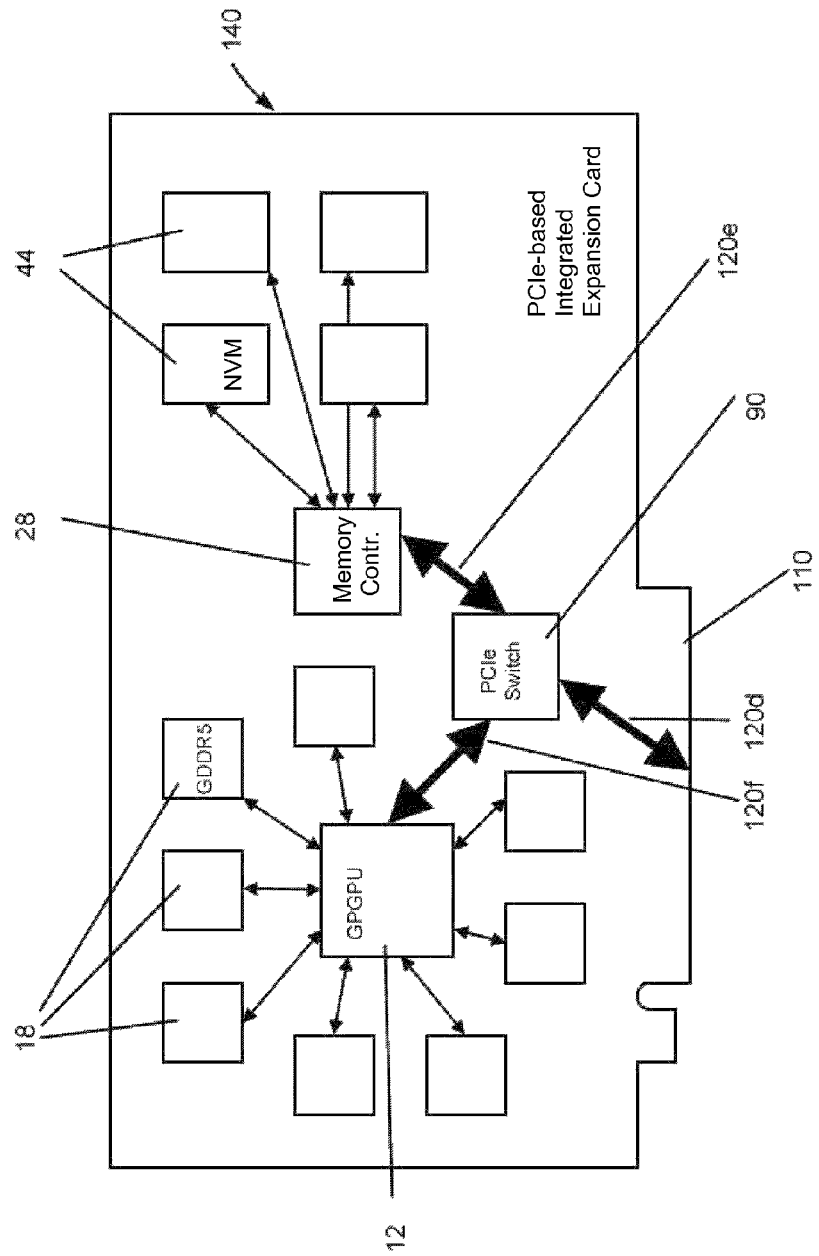
FIG. 13 schematically represents an embodiment of the PCIe-based expansion card of FIG. 10.

FIG. 13 schematically represents a particular embodiment of an expansion card 140 as discussed in reference to FIG. 10. A PCIe edge connector 110 is coupled to a PCIe switch 90 through a PCIe data link 120*d*. The PCIe switch 90 arbitrates the data transfer in a three-way arbitration scheme between the host computer system via the edge connector 110 using the data link 120*d*, the memory controller 28 using the data link 120*e*, and the processor 12 using the data link 120*f*.

One of the issues faced with integrating a GPU and a flash memory controller on the same device and establishing a direct functional coupling without the need to route data through the host computer system is that the GPU and memory controller typically are configured as PCIe endpoints. In most implementations, PCIe endpoints require a PCIe switch or need to pass through a PCIe root complex in order to communicate with each other, which, as discussed above, is feasible but adds complexity and cost to the device. A possible solution to this drawback is represented in FIGS. 14 through 18 as entailing the use of a hybrid processor comprising both CPU and GPU cores instead of a GPU configured for general purpose computing. As previously discussed, such a processor is referred to in the industry as an APU, a commercial example of which is manufactured by AMD. Similar offerings are available from Intel in their second and third generation core processors, such as Sandy Bridge and Ivy Bridge. In addition to x86 (x64) cores and graphics processors, system logic such as PCIe root complex and DRAM controllers are integrated on the same die along with secondary system interfaces such as system agent, Direct Media Interface (DMI), or United Media Interface (UMI) link. For convenience, a processor of this type is identified in FIGS. 14 through 18 as an APU 152, regardless of the specific configuration. The processor 12 can run on the operating system of the host computer system as part of a symmetric multiprocessing architecture, or can run a guest operating system including optional virtual machines and local file systems. The CPU (x86 x64) cores may also locally run specific application programming interfaces (APIs) containing some of the analytics paradigms.

Figure 14:
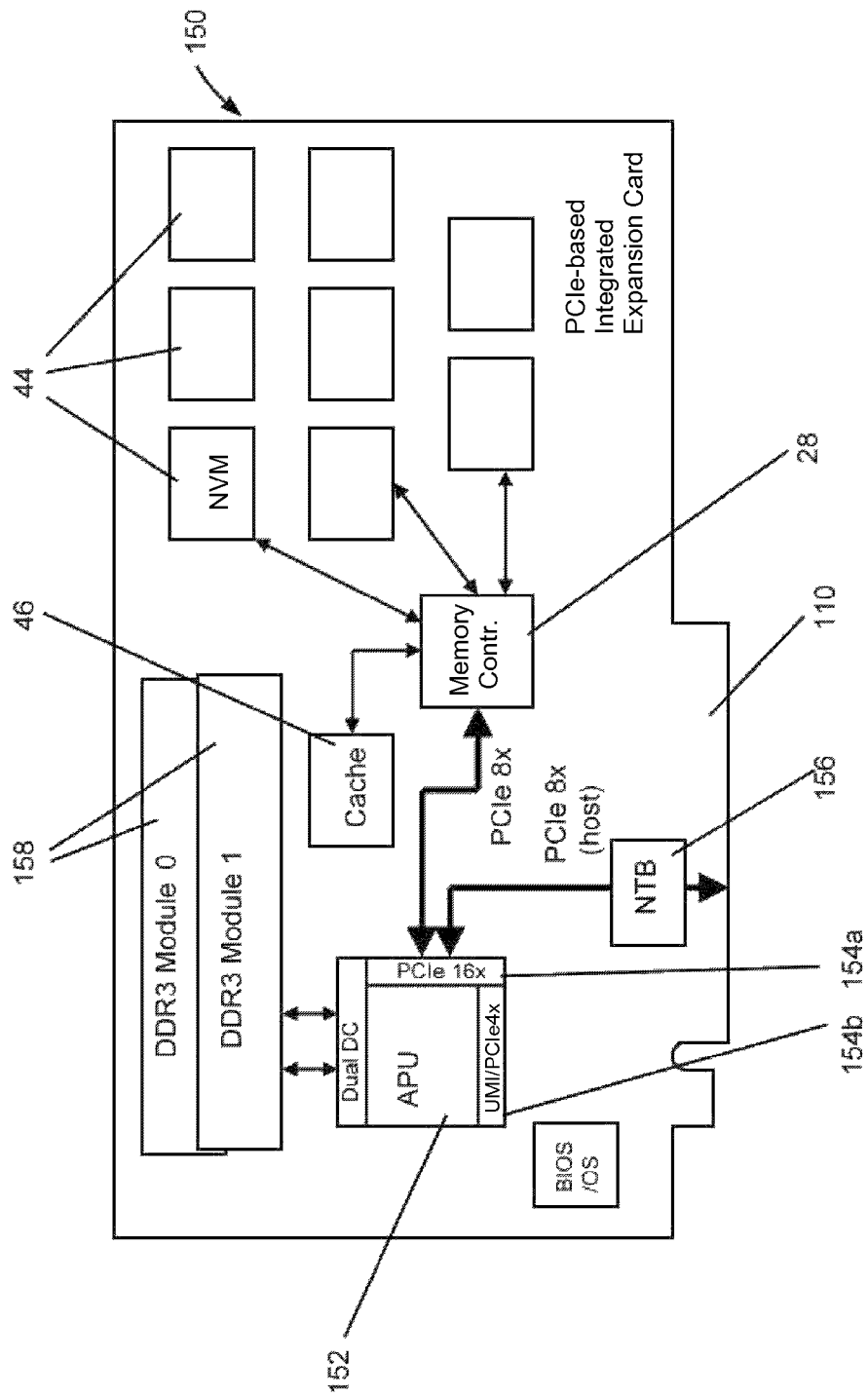
FIG. 14 schematically represents an embodiment of a PCIe-based expansion card of the invention using an advanced processing unit (APU) with an integrated dual channel memory controller and two memory modules, wherein a PCIe 16x interface is split between dedicated PCIe lanes to a host computer system and to the memory controller and communication with the host computer system is established through a non-transparent bridge (NTB).

FIG. 14 schematically illustrates an exemplary embodiment of this type of data processing device, on a single expansion card 150 having a substrate and mounted thereon an APU 152 with integrated dual channel DRAM controllers (Dual DC) to interface with a volatile memory array, represented as comprising two DIMMs 158 that may use, as a nonlimiting example, DDR3 SDRAM technology. It is understood that any suitable volatile memory technology can be used, including DDR4 or other future generations. The APU 152 also has an integrated PCIe root complex represented as including a PCIe interface (link) 154a comprising sixteen PCIe lanes, of which eight PCIe lanes may be dedicated to interface with a PCIe-based memory controller 28 while the remaining eight PCIe lanes are used to establish functional connectivity via the edge connector 110 with a host computer system through a non-transparent bridge (NTB) 156 for electrical and logical isolation of the PCIe and memory domains. The integrated PCIe root complex is further represented as including an ancillary UMI interface (link) 154b comprising four PCIe lanes that may be used for other purposes. The memory controller 28 interfaces with a multi-channel non-volatile memory array 44 made up of, for example, NAND flash memory devices (NAND), though it should be understood that other non-volatile memory technologies can be considered. The memory controller 28 is further functionally coupled to a cache memory 46, which is preferably a volatile DRAM or SRAM IC, or a non-volatile MRAM component, or a combination of volatile and non-volatile memories in a multi-chip configuration as known in the art. The APU 152 may further have its own basic input/output system (BIOS) stored on a local EEPROM. The EEPROM may also contain a compressed operating system such as Linux.

Figure 15:
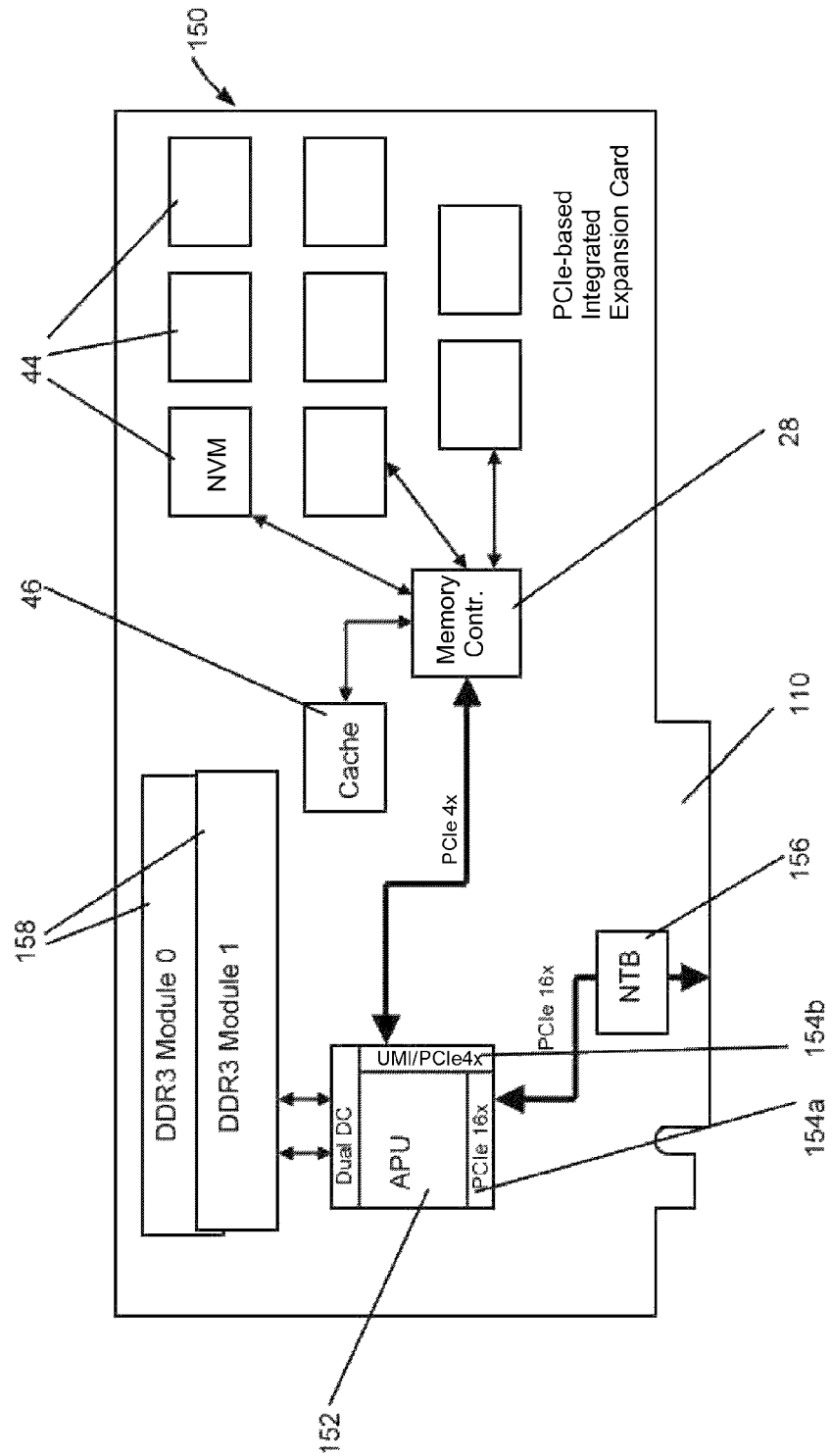
FIG. 15 schematically represents an embodiment of a PCIe-based expansion card of the invention similar to FIG. 14, but using a secondary PCIe (4x) or UMI interface of the APU to interface with the memory controller.

A variation of the embodiment of FIG. 14 is illustrated in FIG. 15, wherein the entire width (all sixteen PCIe lanes) of the PCIe interface 154a is dedicated to establish a functional interface with the host computer system via the edge connector 110. In addition, the UMI interface (link) 154b of the APU 152, comprising 4× PCIe lanes, is used to directly communicate with the memory controller 28. As in the embodiment of FIG. 11, dual channel DRAM controllers (Dual DC) interface with a volatile memory array comprising two DIMMs 158 that may use, as a nonlimiting example, DDR3 SDRAM technology, and the memory controller 28 is coupled to a multi-channel non-volatile memory array 44 made up of, for example, NAND flash memory devices (or another non-volatile memory technology), as well as a read-ahead and write buffer cache 46. The APU 152 is again connected to an edge connector 110 through an NTB (156 for electrical and logical isolation of the PCIe and memory domains.

Figure 16:
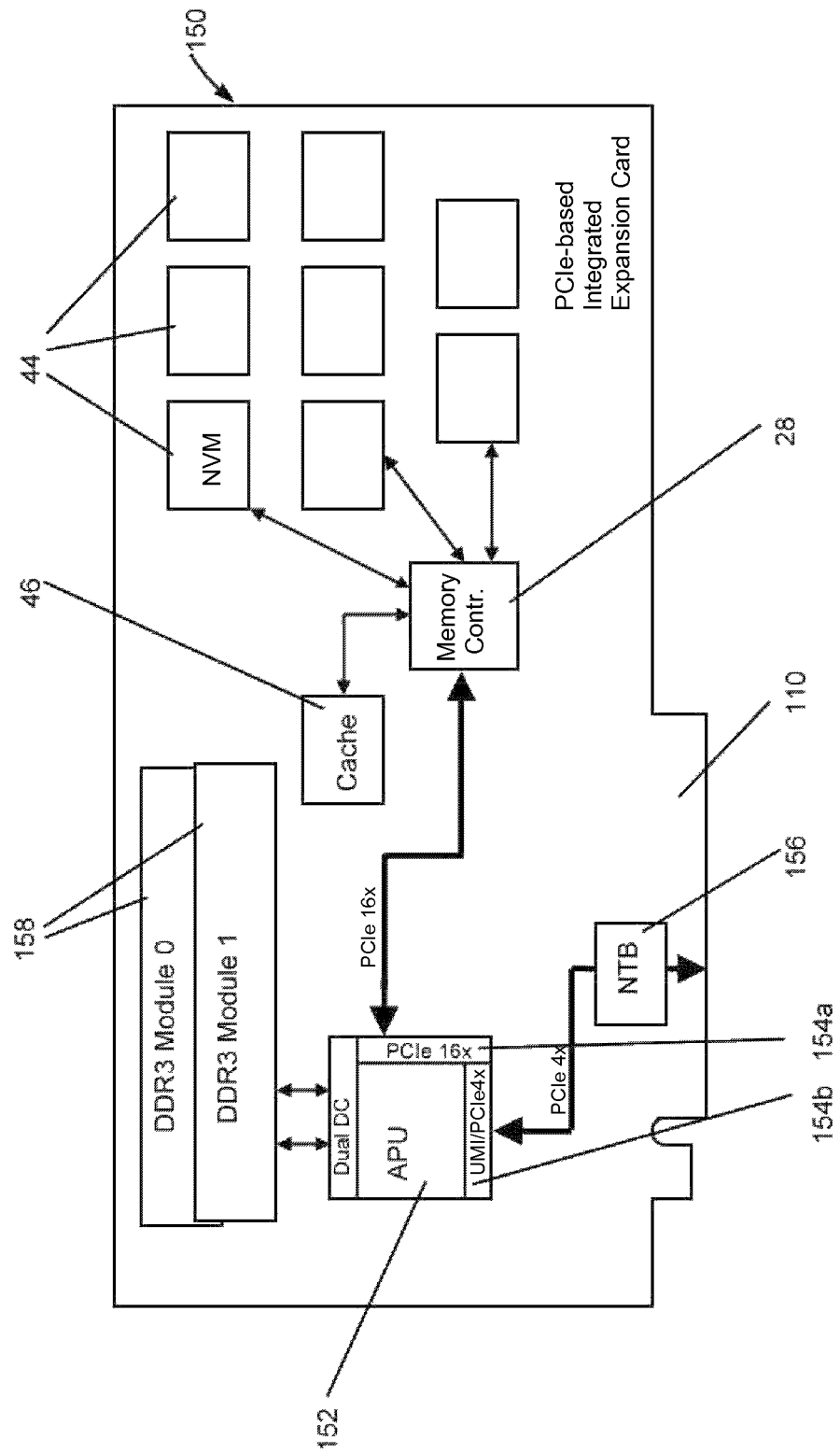
FIG. 16 schematically represents an embodiment of a PCIe-based expansion card of the invention similar to FIG. 14, but using a PCIe 16x interface of the APU to directly interface with the memory controller and a secondary PCIe (4x) interface to communicate with the host computer system via an NTB.

Yet another variation of the embodiment is shown in FIG. 16, wherein the UMI interface 154b comprising 4× PCIe lanes establishes functional connectivity between the APU 152 and the host computer system, whereas the 16× PCIe interface 154a is used for communication between the APU 152 and the memory controller 28. This particular arrangement may be particularly advantageous if, for example, the NVM Express standard, SCSI express standard for SCSI commands over a PCIe channel, or any other advanced flash addressing protocol is used. Similar as discussed above, the PCIe link to the host computer system uses an NTB 156 for electrical and logical isolation of the PCIe and memory domains.

Figure 17:
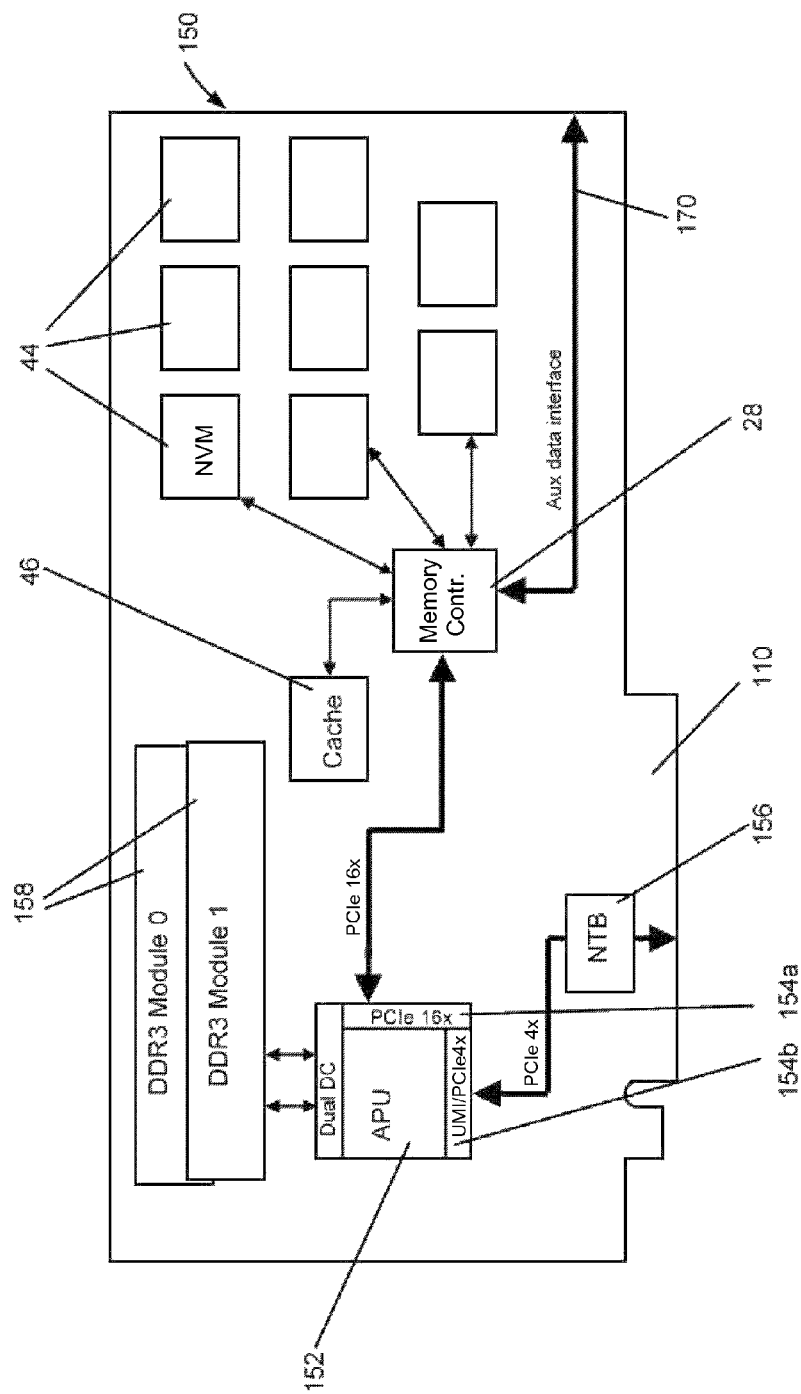
FIG. 17 schematically represents the embodiment of FIG. 16 modified with an auxiliary data interface to load data from a host computer system into the non-volatile memory array of the PCIe-based expansion card.

FIG. 17 schematically represents an additional specific aspect of the embodiment of FIG. 16 (applicable also to FIGS. 14 and 15), having an additional auxiliary data interface 170 to the memory controller 28 that can be used to directly load data from a host computer system (which may be essentially any computer, SAN/NAS, etc.) to the on-board non-volatile memory array 44. In this embodiment, the memory array 44 is used as a queue for data that are accessed either locally on the same host computer system or else may come from a remote location such as a network-attached-storage (NAS) device on the level of the file system using Internet Protocol (IP) or a storage area network (SAN) device using block-level access via Ethernet or fiber channel (FC) (see FIG. 19 and below).

Figure 18:
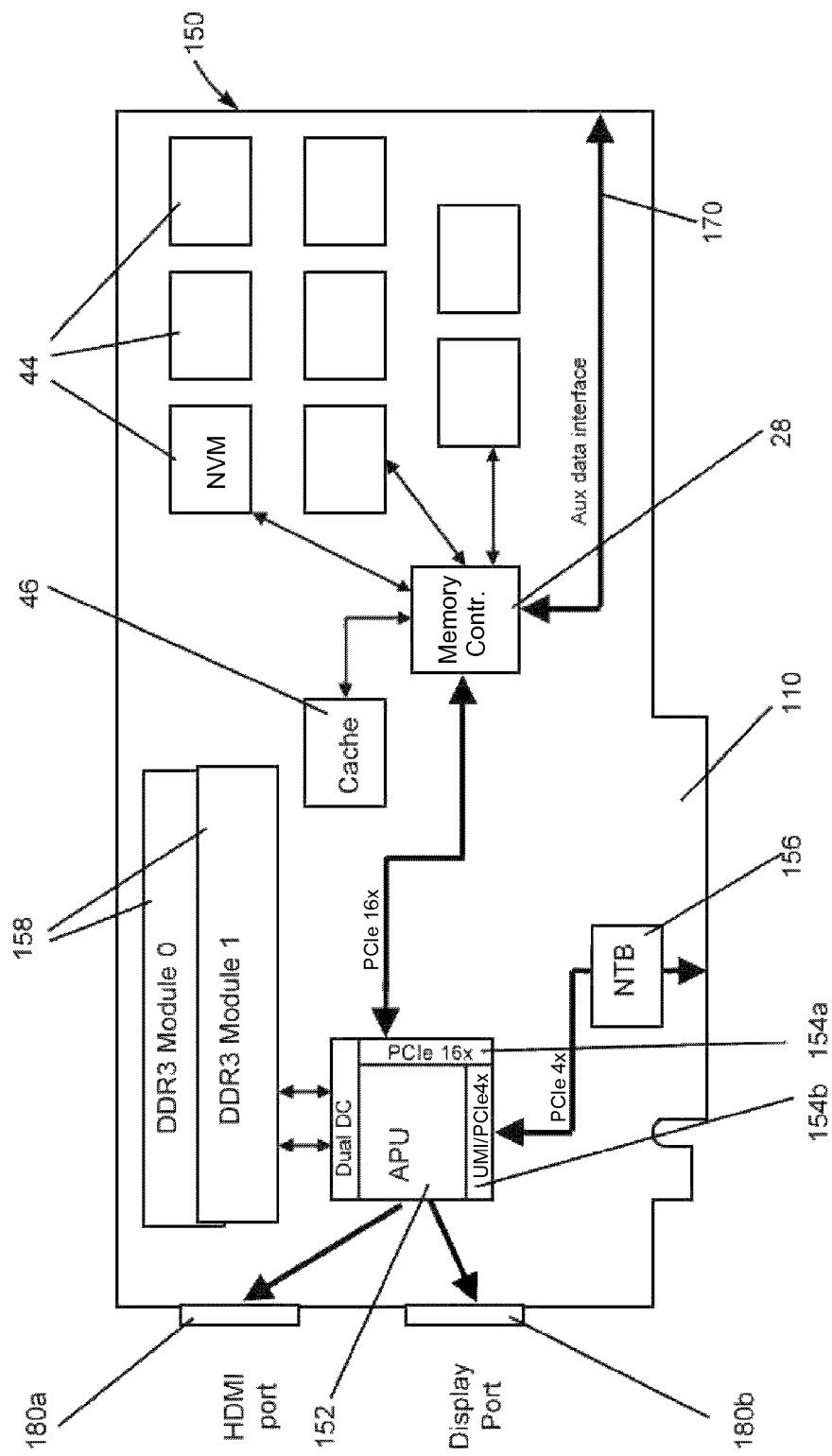
FIG. 18 schematically represents the embodiment of FIG. 17 modified with an additional HDMI and DP port to output data back to the host computer system or an external electronic device.

FIG. 18 schematically represents another possible additional aspect of the embodiments discussed above that uses the graphics port of the APU 152 to stream out data or specifically the results of the analytics performed on the big data. This particular video output port could comprise, for example, an HDMI port 180a and/or a display port (DP) 180b.

Figure 19:
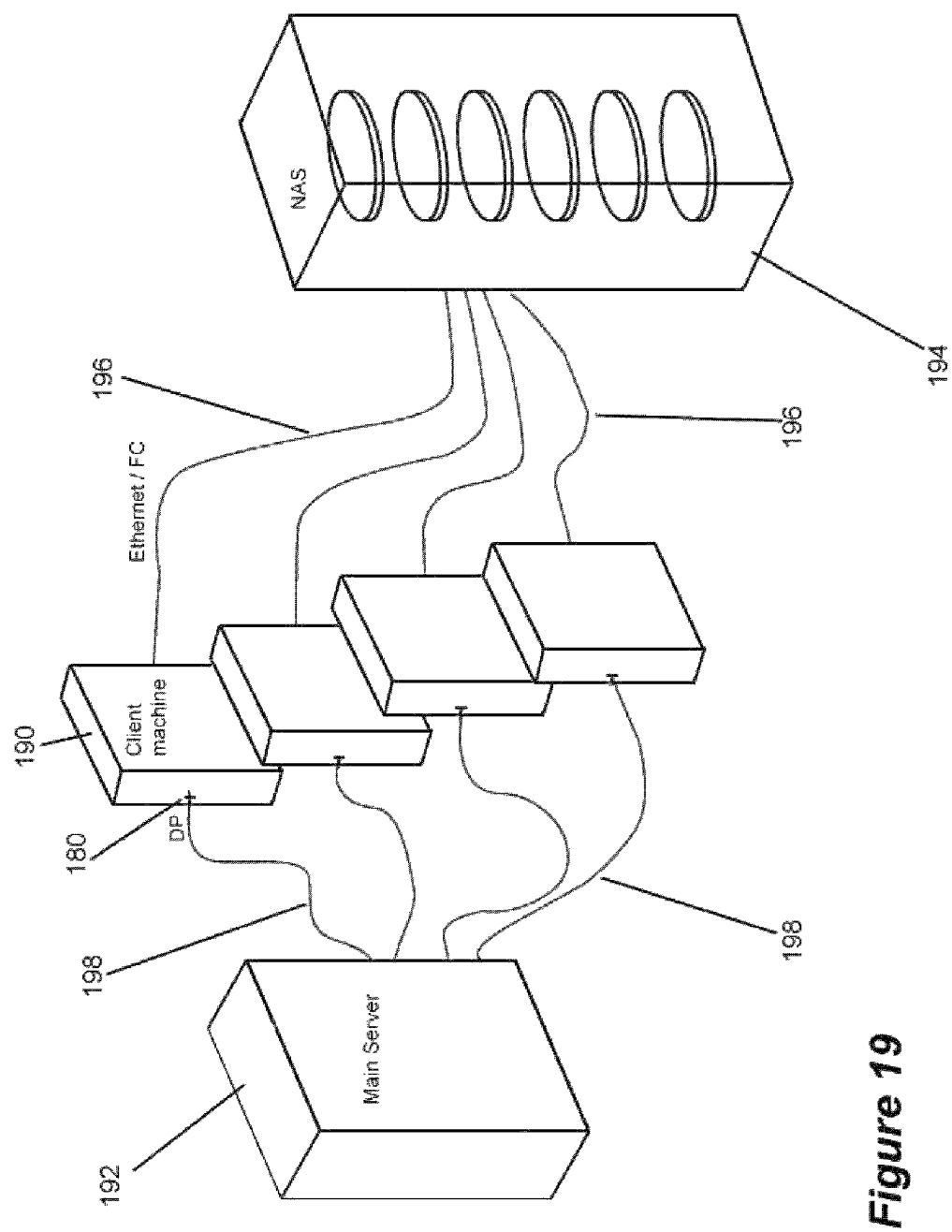
FIG. 19 schematically represents a cluster of client computers each equipped with an integrated storage/processing system of the invention, interfacing through a display port with a central (main) server, and connected to main storage located outside the central server in a storage area network (SAN) or network attached storage (NAS) configuration.

As discussed earlier, big data analytics are run in massively parallel configurations, which also include clustering of processing devices or client computers 190 as shown in FIG. 19. As noted above, the non-volatile memory array 44 can be used as a queue for data that may be accessed via an Ethernet or fiber channel (FC) 196 from a remote location, such as a SAN device or a NAS device 194. Instead of transferring data back to each host computer system and using up costly bandwidth of a client computer's interconnect, one possible implementation of the invention uses the video output of the GPU portion, for example, a display port 180 of the APU 152 to return data through a dedicated cable 198 to either a centralized server 192 or else even to communicate data from one expansion card 150 to another (not illustrated).

Likewise, a second type of auxiliary connector, for example, nVidia's SLI or AMD's CrossfireX link, may be used to communicate data between expansion cards 150 through a bridge connection of a type known and currently used in SLI or CrossfireX. In the context of the invention, this type of bridge connection could comprise a PCIe switch 62 similar to what is represented for the daughter board 60 in FIGS. 6 and 7, but with the bridge connection replacing the daughter board 60. This type of implementation would have the advantage of better ease of integration into existing form factors since no additional height of the PCIe-based expansion cards 150 is incurred through the interposed daughter board 60.

The above physical description of the invention applies to virtual environments as well. A hypervisor can emulate multiple expansion cards from a single physical expansion card 140 and/or 150, such that each virtual machine will "see" an expansion card. Here, the non-volatile memory capacity is divided between the virtual machines and the processor's cores are divided virtual machines. The same functionality applies to each virtual expansion card as it applies to a physical expansion card (with the non-volatile memory and core allocation difference).

In the context of the present disclosure, unless specifically indicated to the contrary, the term "coupled" is used to refer to any type of relationship between the components, which could be electrically, mechanically or logically in a direct or indirect manner. Likewise, the terms first, second and similar are not meant to establish any hierarchical order or prevalence, but merely serve to facilitate the understanding of the disclosure.

While the invention has been described in terms of specific embodiments, it is apparent that other forms could be adopted by one skilled in the art. For example, functionally equivalent memory technology may supersede the DDR3, GDDR5, MRAM and NAND flash memory noted in this disclosure. In addition, other interface technologies may supersede the PCIe interconnect or bridge technology noted herein. Therefore, the scope of the invention is to be limited only by the following claims.

The invention claimed is:

1. An integrated storage/processing system for use in a host computer system having a printed circuit board with a central processing unit, system memory, and an expansion bus mounted thereon, the integrated storage/processing system comprising:
   at least a first expansion board adapted to be connected to the expansion bus of the host computer system, the first expansion board having mounted thereon a graphics processing unit configured for general purpose computing and a local frame buffer comprising volatile memory devices;
   a non-volatile memory array functionally coupled to the graphics processing unit and configured to allow direct data transfers from the non-volatile memory array to the graphics processing unit without routing the transferred data through the system memory of the printed circuit board, the non-volatile memory array being configured to receive sets of big data from the host computer system via the expansion bus thereof; and
   a non-volatile memory controller that accesses the non-volatile memory array;
   wherein the expansion bus of the host computer system comprises a PCIe bus connector functionally coupled to a PCIe root complex on the printed circuit board and the first expansion board interfaces with the host computer system through the PCIe bus connector, and wherein the integrated storage/processing system meets one of the follow requirements:
   (a) the PCIe bus connector is a single-slot PCIe bus connector divided into first and second groups of PCIe lanes, the first group of PCIe lanes is coupled to the graphics processing unit, and the second group of PCIe lanes is coupled to the non-volatile memory controller, the integrated storage/processing system further comprising a third group of PCIe lanes that directly couples the graphics processing unit to the non-volatile memory controller; or
   (b) the integrated storage/processing system further comprises a PCIe switch coupled to the non-volatile memory controller, the PCIe bus connector is a single-slot PCIe bus connector divided into first and second groups of PCIe lanes, the first group of PCIe lanes is coupled to the graphics processing unit, the second group of PCIe lanes is coupled to the PCIe switch, the PCIe switch is coupled to the non-volatile memory controller through a third group of PCIe lanes and to the graphics processing unit through a fourth group of PCIe lanes, and the PCIe switch routes transfer of data between the graphics processing unit, the non-volatile memory controller, and the PCIe bus connector; or
   (c) the non-volatile memory array uses NVM Express standard to interface with the non-volatile memory controller; or
   (d) the non-volatile memory controller implements SCSI express standard for SCSI commands over PCIe lanes.

2. The integrated storage/processing system of claim 1, wherein the non-volatile memory array comprises NAND flash memory components and the non-volatile memory controller is a PCIe-based multi-channel NAND flash memory controller.

3. The integrated storage/processing system of claim 1, wherein the PCIe bus connector is a unified PCIe bus connector coupled to a switch/transparent bridge that arbitrates signals between the host computer system, the graphics processing unit, and the non-volatile memory controller for transfer of PCIe packets between the host computer system and the graphics processing unit, between the host computer system and the non-volatile memory controller, and between the non-volatile memory controller and the graphics processing unit.

4. The integrated storage/processing system of claim 1, wherein the non-volatile memory controller comprises an auxiliary data link adapted to transfer data from the host computer system to the non-volatile memory array.

5. The integrated storage/processing system of claim 1, wherein the non-volatile memory array and the non-volatile memory controller are mounted on the first expansion board with the graphics processing unit.

6. The integrated storage/processing system of claim 1, wherein the first expansion card is a graphics expansion card further comprising a PCIe-based edge connector functionally coupled to the graphics processing unit, the integrated storage/processing system further comprising: a solid-state drive comprising a second expansion card having mounted thereon the non-volatile memory array, a non-volatile memory controller functionally coupled to the non-volatile memory array, and a PCIe-based edge connector; and
   a daughter board comprising a PCIe switch, at least one PCIe-based edge connector coupled to the PCIe switch, and at least two PCIe-based expansion slots coupled to the PCIe switch for arbitration of signals between the PCIe-based edge connector of the daughter board and the PCIe-based expansion slots of the daughter board, the PCIe-based edge connector of the graphics expansion card being received in at least one of the PCIe-based expansion slots of the daughter board and the PCIe-based edge connector of the second expansion card being received in at least one of the PCIe-based expansion slots of the daughter board.

7. The integrated storage/processing system of claim 6, wherein the PCIe switch is a transparent bridge.

8. The integrated storage/processing system of claim 6, wherein the non-volatile memory array comprises NAND flash memory components.

9. The integrated storage/processing system of claim 8, wherein the non-volatile memory array and the non-volatile memory controller interface using NVM Express standard.

10. The integrated storage/processing system of claim 8, further comprising a SATA SSD controller used in combination with the non-volatile memory controller to interface with the NAND flash memory components.

11. The integrated storage/processing system of claim 6, wherein the non-volatile memory controller implements SCSI express standard for SCSI commands over PCIe lanes.

12. The integrated storage/processing system of claim 6, wherein the non-volatile memory controller comprises an auxiliary data link adapted to transfer data from the host computer system to the non-volatile memory array.

13. The integrated storage/processing system of claim 6, wherein the integrated storage/processing system performs big data analytics computing to generate data, and the graphics expansion card has a graphics port configured to transfer the generated data to an electronic device outside the host computer system.

14. The integrated storage/processing system of claim 1, wherein the first expansion card is a graphics expansion card further comprising a PCIe-based edge connector functionally coupled to the graphics processing unit and adapted to be coupled to a first PCIe expansion slot of the expansion bus of the host computer system, and further comprising a second connector adapted to transfer PCIe signals, the integrated storage/processing system further comprising:
 a solid-state drive comprising a second expansion card having mounted thereon the non-volatile memory array, a non-volatile memory controller functionally coupled to the non-volatile memory array, a PCIe-based edge connector adapted to be coupled to the graphics processing unit through a second PCIe expansion slot of the expansion bus of the host computer system, and a second connector adapted to transfer PCIe signals; and
 a bridge board comprising a transparent PCIe switch and at least two connectors that are coupled to the PCIe switch and configured to mate with the second connectors of the graphics expansion card and the solid-state drive, the bridge board enabling exchange of signals between the graphics expansion card and the solid-state drive without accessing the first and second PCIe expansion slots of the host computer system.

15. A big data analytics process utilizing the integrated storage/processing system of claim 1, the process comprising:
 connecting a back-end storage device to at least one client computer having the integrated storage/processing system of claim 1;
 performing a big data analytic computing operation with the integrated storage/processing system on big data stored in the back-end storage device; and
 transferring the results of the big data analytic computing operation to a central computer via a graphics link.

16. The big data analytics process of claim 15, wherein the back-end storage device is a network-attached storage (NAS) providing file system-level access of the big data to the integrated storage/processing system.

17. The big data analytics process of claim 15, wherein the back-end storage device is a storage area network (SAN) providing block-level access of the big data to the integrated storage/processing system.

18. An integrated storage/processing system for use in a host computer system having a printed circuit board with a central processing unit, system memory, and a PCIe expansion bus mounted thereon, the integrated storage/processing system comprising a processor expansion board that comprises:
 a PCIe-based edge connector adapted to communicate signals with the host computer system through the PCIe expansion bus of the host computer system;
 a local array of volatile memory devices;
 a non-volatile solid-state memory-based storage subsystem;
 non-volatile memory controller functionally coupled to the non-volatile solid-state memory-based storage subsystem;
 a hybrid processing unit having a general purpose computing core, a graphics processing core, an integrated memory controller coupled to the local array of volatile memory devices, and an integrated PCIe root complex coupled to the non-volatile solid-state memory-based storage subsystem; and
 a non-transparent bridge that couples the hybrid processing unit to the PCIe-based edge connector.

19. The integrated storage/processing system of claim 18, wherein the PCIe root complex of the hybrid processing unit comprises first and second PCIe interfaces, the first PCIe interface having more PCIe lanes than the second PCIe interface.

20. The integrated storage/processing system of claim 19, wherein the first PCIe interface is split into groups of PCIe lanes, a first group of the PCIe lanes is coupled to the non-transparent bridge, and a second group is coupled to the non-volatile memory controller.

21. The integrated storage/processing system of claim 19, wherein the first PCIe interface is coupled to the non-transparent bridge and the second PCIe interface is coupled to the non-volatile memory controller.

22. The integrated storage/processing system of claim 19, wherein the first PCIe interface is coupled to the non-volatile memory controller and the second PCIe interface is coupled to the non-transparent bridge.

23. The integrated storage/processing system of claim 18, wherein the non-volatile memory controller comprises an auxiliary data link adapted to transfer data from the host computer system to the non-volatile memory array.

24. The integrated storage/processing system of claim 18, wherein the integrated storage/processing system performs big data analytics computing to generate data, and the graphics expansion card has a graphics port configured to transfer the generated data to an electronic device outside the host computer system.

25. The integrated storage/processing system of claim 18, wherein the hybrid processing unit is adapted to run at least one virtual machine.

26. A method for performing big data analytics utilizing the integrated storage/processing system of claim 18, the method comprising:
 connecting a back-end storage device to at least one client computer having the integrated storage/processing system of claim 18;
 performing a big data analytic computing operation with the integrated storage/processing system on big data stored in a back-end storage device; and transferring the results of the big data analytic computing operation to a central computer via a graphics link.

27. The method of claim 26, wherein the back-end storage device is a network-attached storage (NAS) providing file system-level access of the big data to the integrated storage/processing system.

28. The method of claim 26 where the back-end storage is a storage area network (SAN) providing block-level access of the big data to the integrated storage/processing system.

29. A method for analyzing big data using an integrated storage/processing system in a host computer system having a printed circuit board with a central processing unit, system memory, and an expansion bus mounted thereon, the method comprising:
   transmitting sets of big data from the host computer system via the expansion bus thereof to a non-volatile memory array of the integrated storage/processing system, the integrated storage/processing system comprising a printed circuit board having mounted thereon a graphics processing unit configured for general purpose computing, a local frame buffer comprising volatile memory devices, and the non-volatile memory array functionally coupled to the graphics processing unit;
   performing direct data transfers from the non-volatile memory array to the graphics processing unit without routing the transferred data through the system memory of the host computer system; and
   accessing the non-volatile memory array with a non-volatile memory controller;
   wherein the expansion bus of the host computer system comprises a PCIe bus connector functionally coupled to a PCIe root complex on the printed circuit board and the method further comprises interfacing the integrated storage/processing system with the host computer system through the PCIe bus connector, and wherein the method meets one of the follow requirements:
      (a) the PCIe bus connector is a single-slot PCIe bus connector divided into first and second groups of PCIe lanes, the first group of PCIe lanes being coupled to the graphics processing unit, the second group of PCIe lanes being coupled to the non-volatile memory controller, and a third group of PCIe lanes directly coupling the graphics processing unit to the non-volatile memory controller, or
      (b) the PCIe bus connector is a single-slot PCIe bus connector divided into first and second groups of PCIe lanes, the first group of PCIe lanes being coupled to the graphics processing unit, the second group of PCIe lanes being coupled to a PCIe switch, the PCIe switch being coupled to the non-volatile memory controller through a third group of PCIe lanes and to the graphics processing unit through a fourth group of PCIe lanes, the method further comprising using the PCIe switch to arbitrate transfers of data between the graphics processing unit, the non-volatile memory controller, and the PCIe bus connector, or
      (c) the method further comprises using NVM Express standard to interface the non-volatile memory array with the non-volatile memory controller, or
      (d) the method further comprises implementing SCSI express standard for SCSI commands over PCIe lanes with the non-volatile memory controller.

30. The method of claim 29, wherein the non-volatile memory array comprises NAND flash memory components and the non-volatile memory controller is a PCIe-based multi-channel NAND flash memory controller, the method comprising accessing the NAND flash memory components through the PCIe-based multi-channel NAND flash memory controller.

31. The method of claim 29 wherein the PCIe bus connector is a unified PCIe bus connector coupled to a switch/transparent bridge, the switch/transparent bridge arbitrating signals between the host computer system, the graphics processing unit and the non-volatile memory controller for the transfer of PCIe protocol based command, address, and data (CAD) packets between the host computer system and the graphics processing unit, between the host computer system and the non-volatile memory controller, and between the non-volatile memory controller and the graphics processing unit.

32. The method of claim 29, wherein the non-volatile memory controller has an auxiliary data link and the method comprises transferring data from the host computer system to the non-volatile memory via the auxiliary data link.

33. A method for analyzing big data using an integrated storage/processing system in a host computer system having a printed circuit board with a central processing unit, system memory, and a PCIe bus connector mounted thereon, the method comprising:
   transmitting sets of big data from the host computer system via the PCIe bus connector thereof to a non-volatile memory array of the integrated storage/processing system, the integrated storage/processing system comprising:
      a graphics expansion card having mounted thereon a graphics processing unit configured for general purpose computing, a local frame buffer comprising volatile memory devices, and a PCIe-based edge connector coupled to the graphics processing unit;
      a solid-state drive comprising a second circuit board having mounted thereon the non-volatile memory array, a non-volatile memory controller functionally coupled to the non-volatile memory array, and a PCIe-based edge connector; and
      a daughter board comprising a PCIe switch, at least one PCIe-based edge connector coupled to the PCIe switch, and at least two PCIe-based expansion slots coupled to the PCIe switch and arbitrating signals between the PCIe-based edge connector of the daughter board and the PCIe-based expansion slots of the daughter board, the PCIe-based edge connector of the graphics expansion card being received in at least one of the PCIe-based expansion slots of the daughter board and the PCIe-based edge connector of the second expansion card being received in at least one of the PCIe-based expansion slots of the daughter board; and
   performing direct data transfers from the non-volatile memory array to the graphics processing unit through the PCIe switch without routing the transferred data through the system memory of the host computer system.

34. The method of claim 33, wherein the PCIe switch is a transparent bridge.

35. The method of claim 33, wherein the non-volatile memory array comprises NAND flash memory components and the non-volatile memory controller is a PCIe-based multi-channel NAND flash memory controller, the method comprising accessing the NAND flash memory components through the PCIe-based multi-channel NAND flash memory controller.

36. The method of claim 35, further comprising using NVM Express standard to interface the non-volatile memory array with the non-volatile memory controller.

37. The method of claim 35, further comprising using a SATA SSD controller in combination with the non-volatile memory controller to interface with the NAND flash memory components.

38. The method of claim 35, further comprising implementing SCSI express standard for SCSI commands over PCIe lanes with the non-volatile memory controller.

39. The method of claim 33, wherein the non-volatile memory controller has an auxiliary data link and the method comprises transferring data from the host computer system to the non-volatile memory via the auxiliary data link.

40. The method of claim 33, wherein the big data analyzed using the integrated storage/processing system generates data, and the graphics expansion card has a graphics port that transfers the generated data to an electronic device outside the host computer system.

41. A method for analyzing big data using an integrated storage/processing system in a host computer system having a printed circuit board with a central processing unit, system memory, and a PCIe expansion bus mounted thereon, the integrated storage/processing system comprising:
a graphics expansion card having mounted thereon a graphics processing unit configured for general purpose computing, a local frame buffer comprising volatile memory devices, a PCIe-based edge connector coupled to the graphics processing unit and coupled to a first PCIe expansion slot of the PCIe expansion bus of the host computer system, and a second connector adapted to transfer PCIe signals;
a solid-state drive comprising a second expansion card having mounted thereon the non-volatile memory array, a non-volatile memory controller functionally coupled to the non-volatile memory array, a PCIe-based edge connector coupled to the graphics processing unit through a second PCIe expansion slot of the PCIe expansion bus of the host computer system, and a second connector adapted to transfer PCIe signals; and
a bridge board comprising a transparent PCIe switch and at least two connectors that are coupled to the PCIe switch and mate with the second connectors of the graphics expansion card and the solid-state drive;
the method comprising:
transmitting sets of big data from the host computer system via the PCIe expansion bus thereof to the non-volatile memory array of the solid-state drive; and
exchanging signals between the graphics expansion card and the solid state drive with the bridge board without accessing the first and second PCIe expansion slots of the host computer system.

42. A method for analyzing big data using an integrated storage/processing system in a host computer system having a printed circuit board with a central processing unit, system memory, and a PCIe expansion bus mounted thereon, the integrated storage/processing system comprising a processor expansion board that comprises:
a PCIe-based edge connector adapted to communicate signals with the host computer system through the PCIe expansion bus of the host computer system;
a local array of volatile memory devices;
a non-volatile solid-state memory-based storage subsystem;
non-volatile memory controller functionally coupled to the non-volatile solid-state memory-based storage subsystem;
a hybrid processing unit having a general purpose computing core, a graphics processing core, an integrated memory controller coupled to the local array of volatile memory devices, and an integrated PCIe root complex coupled to the non-volatile solid-state memory-based storage subsystem; and
a non-transparent bridge that couples the hybrid processing unit to the PCIe-based edge connector;
the method comprising:
transmitting sets of big data from the host computer system via the PCIe expansion bus thereof to the non-volatile memory array of the integrated storage/processing system; and
performing direct data transfers from the non-volatile memory array to the graphics processing unit without routing the transferred data through the system memory of the host computer system.

43. The method of claim 42, wherein the PCIe root complex of the hybrid processing unit comprises first and second PCIe interfaces, the first PCIe interface having more PCIe lanes than the second PCIe interface.

44. The method of claim 43, wherein the first PCIe interface is split into groups of PCIe lanes, a first group of the PCIe lanes is coupled to the non-transparent bridge, and a second group is coupled to the non-volatile memory controller.

45. The method of claim 43, wherein the first PCIe interface is coupled to the non-transparent bridge and the second PCIe interface is coupled to the non-volatile memory controller.

46. The method of claim 43, wherein the first PCIe interface is coupled to the non-volatile memory controller and the second PCIe interface is coupled to the non-transparent bridge.

47. The method of claim 43, wherein the graphics expansion card has a graphics port, the method further comprising:
performing big data analysis on the data transferred from the non-volatile memory array to the graphics processing unit to generate data; and
using the graphics port to transfer the generated data to an electronic device outside the host computer system.

48. The method of claim 43, wherein the hybrid advanced processing unit is running at least one virtual machine.

49. The integrated storage/processing system of claim 42, wherein the non-volatile memory controller comprises an auxiliary data link and the method comprises transferring data from the host computer system to the non-volatile memory via the auxiliary data link.

* * * * *